(12) United States Patent
Tan

(10) Patent No.: US 9,565,184 B2
(45) Date of Patent: *Feb. 7, 2017

(54) DIGITAL CERTIFICATION ANALYZER TEMPORARY EXTERNAL SECURED STORAGE

(71) Applicant: Anthony Tan, Las Vegas, NV (US)

(72) Inventor: Anthony Tan, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,012

(22) Filed: Jul. 12, 2016

(65) Prior Publication Data

US 2016/0323262 A1  Nov. 3, 2016

Related U.S. Application Data

(63) Continuation-in-part of application No. 14/501,447, filed on Sep. 30, 2014, now Pat. No. 9,419,965.

(51) Int. Cl.
| | |
|---|---|
| H04L 29/06 | (2006.01) |
| G06F 21/10 | (2013.01) |
| G06F 21/33 | (2013.01) |
| H04L 9/32 | (2006.01) |
| G06F 21/62 | (2013.01) |

(52) U.S. Cl.
CPC ......... *H04L 63/083* (2013.01); *H04L 63/0846* (2013.01); *H04L 63/108* (2013.01); *G06F 21/10* (2013.01); *G06F 21/335* (2013.01); *G06F 21/6218* (2013.01); *G06F 2221/2137* (2013.01); *H04L 9/3213* (2013.01); *H04L 9/3228* (2013.01); *H04L 63/0428* (2013.01); *H04L 63/08* (2013.01); *H04L 63/0838* (2013.01)

(58) Field of Classification Search
CPC  G06F 2221/2137; G06F 21/10; G06F 21/335; G06F 21/6218; H04L 9/3228; H04L 9/3213; H04L 63/0428; H04L 63/08; H04L 63/0838

See application file for complete search history.

(56) References Cited

U.S. PATENT DOCUMENTS

| | | | | |
|---|---|---|---|---|
| 2002/0162104 | A1* | 10/2002 | Raike | G06F 21/10 725/31 |
| 2005/0005114 | A1* | 1/2005 | Medvinsky | G06F 21/10 713/168 |
| 2005/0278716 | A1* | 12/2005 | Koppen | G06F 21/10 717/168 |
| 2007/0026942 | A1* | 2/2007 | Kinsley | G06F 21/121 463/29 |
| 2010/0154047 | A1* | 6/2010 | Roach | H04L 63/20 726/9 |
| 2011/0179273 | A1* | 7/2011 | Hjelm | H04L 63/0428 713/168 |
| 2012/0324552 | A1* | 12/2012 | Padala | H04L 9/3213 726/6 |

(Continued)

*Primary Examiner* — Jayesh Jhaveri
(74) *Attorney, Agent, or Firm* — Lightbulb IP, LLC

(57) ABSTRACT

A digital certification analyzer (or "analyzer") provides protection for digital content stored on servers, file sharing systems, hard drives and USB enabled external drives or other digital repositories. A temporary external secured storage (or "TESS") system provides an external storage location for digital content hosted and transferred or shared in a digital realm, while the original device hosting the content is turned off or otherwise offline during the file share or file transfer process.

20 Claims, 18 Drawing Sheets

(56) References Cited

U.S. PATENT DOCUMENTS

| | | | |
|---|---|---|---|
| 2012/0331529 A1* | 12/2012 | Ibel | G06F 21/6218 |
| | | | 726/4 |
| 2014/0273957 A1* | 9/2014 | Reitz | H04W 4/008 |
| | | | 455/411 |
| 2014/0304167 A1* | 10/2014 | Atkinson | G06Q 20/1235 |
| | | | 705/59 |
| 2015/0058935 A1* | 2/2015 | Tolia | H04L 63/08 |
| | | | 726/4 |
| 2015/0287019 A1* | 10/2015 | Barsalou | G06Q 20/10 |
| | | | 705/44 |

* cited by examiner

DIGITAL CERTIFICATION ANALYZER TEMPORARY EXTERNAL SECURED STORAGE

CROSS-REFERENCE TO RELATED APPLICATION

This application is a continuation-in-part of U.S. patent application Ser. No. 14/501,447, filed Sep. 30, 2014.

BACKGROUND OF THE INVENTION

1. Field of the Invention

This invention relates to identity authentication and verification as it pertains to securing and accessing content in a digital environment.

2. Related Art

The devices, features, and functions described herein are intended to address shortcomings that currently exist within the digital security and password protection marketplace. There are currently a variety of ways for users to secure and protect their digital content and authenticate or validate their ownership and/or control of their content with the use of passwords.

Other digital identification and password protection systems known in the prior art exist that provide varying layers of protection. Such prior art systems employ a variety of methods to protect and/or secure content within a digital realm. These protection methodologies are often referred to as "password protection", and require a user to create a password or code that enables them to access their digital content (such as email or other online secure access entity). These passwords are designed to protect content that is in the immediate control of the content owner or host.

From the discussion that follows, it will become apparent that the present invention addresses the deficiencies associated with the prior art while providing additional advantages and benefits not contemplated or possible with prior art constructions.

SUMMARY OF THE INVENTION

A digital certification analyzer (or "analyzer") herein provides a method for shared digital content to be stored on a temporary storage repository in cases where the device sharing the content is without power, disconnected, or otherwise turned off. The Temporary External Secured Storage (TESS) system is designed to allow a user to designate an alternative external storage location to temporarily host digital content being shared from a primary user (content owner) to one or more second users.

In one preferred embodiment of the TESS system, a user (file owner) may wish to transfer a file to a second user or group of users (file recipient) from their portable computing device such as a tablet or smartphone. Since the primary user (file owner) intends to deactivate the smartphone or tablet hosting the file to be transferred, the TESS system will send a copy of the file to be transferred to a temporary external secured storage location, designated by the primary user (file owner). The file will be transferred to the temporary external secured storage location, and will remain there for a time designated by the primary user (file owner) to facilitate the transfer while the host device is turned off, or otherwise offline.

The TESS system is designed to provide two primary functions. The first is to enable the successful transfer of digital content between one or more users while the device hosting the file to be transferred is turned off or otherwise disconnected from the analyzer (offline). The second primary function is to allow the digital content owner/host to determine the location in which the TESS will temporarily host the digital content being transferred, and to determine how long that temporary hosting will remain active to facilitate the transfer.

The analyzer incorporates the TESS system to allow users to select a temporary external secured storage location to host digital content being transferred, thus eliminating the need to either leave the host device connected to the system or to allow the digital content to be uploaded and stored in the cloud on a public server. The TESS system specifically utilizes temporary external secured storage locations that are selected and controlled by the owner of the digital content being transferred.

In one exemplary embodiment, a primary user (file owner) wishes to transfer a file that is currently hosted on their smartphone to a second user (recipient). The primary user engages the TESS system and reviews a list of their personal devices connected to the analyzer. The list may include (but is not limited to) a personal computer located at the primary users' home, a tablet computing device located at the primary users' office, and a laptop personal computer located at the primary users' office. The primary user chooses their personal computer located at their home as the temporary external secured storage device to host the file being transferred to the second user. The TESS system will make a copy of the file to be transferred and (through the analyzer) will place the copy of the file on the primary user's personal computer located at the primary users' home, in a folder and directory chosen by the primary user. The TESS system will provide an access link to the recipient of the file being transferred that will provide the temporary file hosting location. The recipient will not know where the file transfer is being hosted, but they will be aware that the primary user is hosting the file share/transfer.

The TESS system allows the primary user hosting/transferring the file to determine how long a transfer link will be effective, regardless of the chosen hosting location. This allows the primary user to control all aspects of the file transfer as well as the availability of the file transfer.

When utilized as a component of the analyzer, the TESS system provides a high level of security, privacy and control over digital content that is being shared, transferred, and accessed between multiple users in a digital environment.

While this submission will discuss the uses of the TESS system as a component of the analyzer, it's important to note that the TESS system can be deployed independently of the analyzer, and can be utilized as a component of a variety of host computing configurations including (but not limited to) cloud storage computing systems, software as a service (SaaS) computing systems, platform as a service (PaaS) computing systems, and other multi-user platforms designed to manage, control, share, and collaborate with digital content.

The TESS system is a software-based system and, in one or more embodiments, is stored on a tangible medium, such as a magnetic, optical, flash or other media type drive or storage repository. The TESS system may be installed on one or more devices (such as a laptop, smartphone, tablet, or other smart devices), or be hosted within a secondary system, such as a file sharing system. One such file sharing system (STOAMIGO) utilizes the TESS system to allow users to choose a temporary external secured storage location to host digital content being transferred between users, while the device hosting the transfer is turned off or is otherwise offline and cannot access the file sharing system. This file sharing system (STOAMIGO) is utilized throughout this submission to illustrate the preferred embodiments of the TESS system.

While this submission shares many examples utilizing the StoAmigo file sharing system, the analyzer may be used in other file sharing systems including (but not limited to) DROPBOX, SUGARSYNC and other "cloud storage" type systems. The TESS system can be incorporated into any system wherein digital content is stored on a hard drive, USB drive, server, network, tablet, smart-type device, PC, cellphone or any other repository where digital content can be stored and accessed.

The TESS system can be utilized as a component to an existing system such as an email system, FTP (File Transfer Protocol) server, or other system where digital content is stored and accessible within a digital environment.

Other systems, methods, features and advantages of the TESS system will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

Figure 1:
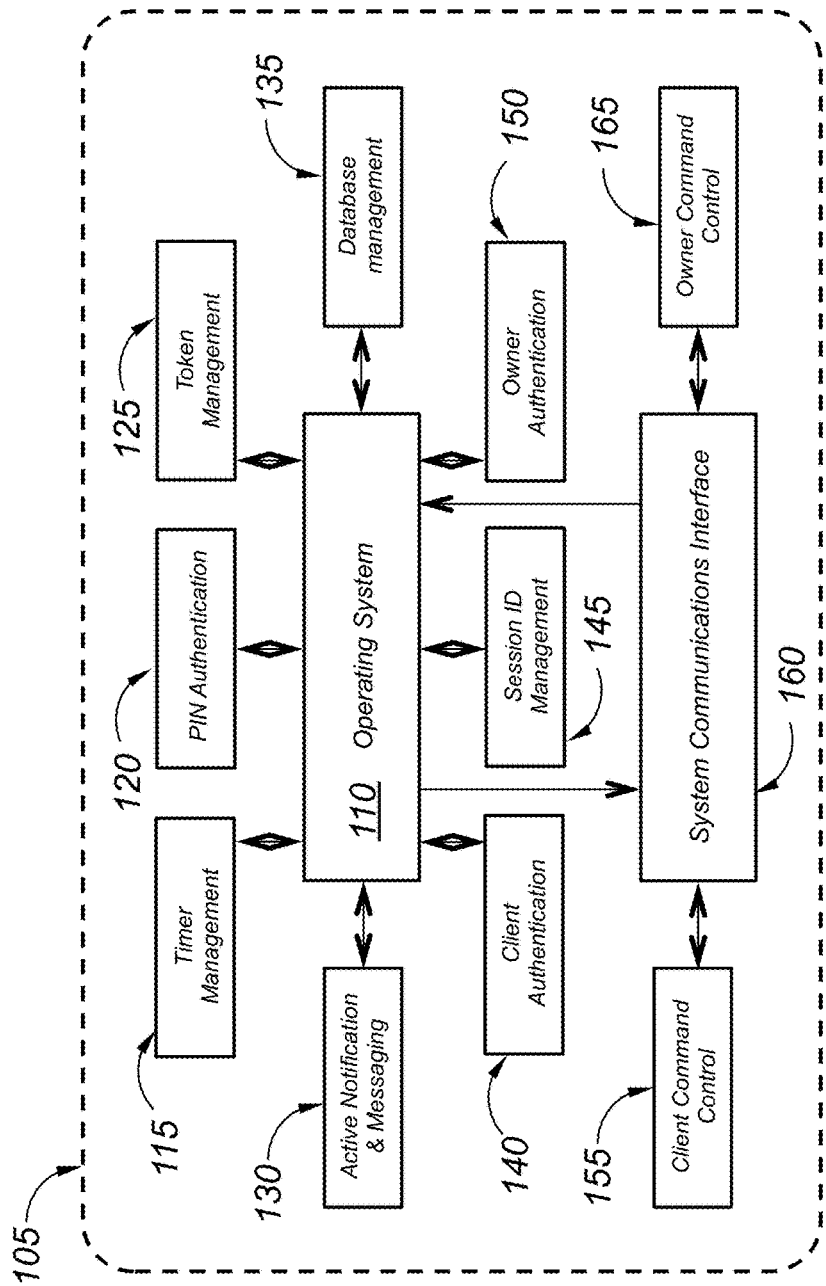
FIG. 1 is a block diagram of the framework and key components of the analyzer.

In the following description, numerous specific details are set forth in order to provide a more thorough description of the present invention. It will be apparent to one skilled in the art that the present invention may be practiced without these specific details. In other instances, well-known features have not been described in detail so as not to obscure the invention.

The analyzer allows owners and administrators of digital content to protect their content within a digital environment such as a hard drive, USB drive, server, cloud network or other environment where digital content is stored, transferred and/or shared. The analyzer utilizes a series of passphrases and codes that certify, validate, and authorize a session to occur for access to the digital content being protected. Digital content (such as files, folder, directories, hard drives, USB drives, servers, etc.) can be secured using this system, preventing unauthorized access while the content is stored in a digital environment, or while it is otherwise being shared with one or more recipients.

The analyzer provides a session timer that can be engaged by the system administrator or the digital content owner, allowing the access time to the digital content to be restricted to a specific period of time. The session timer can be managed in increments of one minute (60 seconds) and can be extended for any duration required by the content owner or administrator, and as many times as desired. Specifically (as an example) the session timer can be set to extend a secured access session for 5 minutes. Once the 5 minutes have expired, the session timer can be extended again. This process can be repeated. The session timer can be enabled or disabled at any time by the system administrator or the digital content owner. In addition to the ability to extend secure sessions, the session timer is capable of limiting the number of sessions to access digital content.

The session timer can be set to limit or control access time associated with anyone accessing the digital content. Specifically, the owner of the digital content can choose to apply the timer to their own access, or to the access of a recipient that the content has been assigned to, transferred to, or otherwise shared with using a file sharing or file transfer type system. The session timer can serve as a safety device for the owner of the content, preventing access after a predefined amount of time (set by the owner) or after a period of inactivity.

The analyzer provides a token timer that can be configured by the administrator or the owner of digital content to set the expiration time and/or date of a token being sent from the system to certify access authorization. The token timer can be managed in one minute intervals and is intended to allow the administrator to restrict the amount of time a certification token is authorized for use. This prevents the token from being mismanaged or utilized in an unauthorized fashion.

The analyzer provides a share timer that allows the administrator or the owner of digital content to set an expiration time and/or date for content shared through the analyzer. This share timer can be configured independently of the token and session timers, and can be used to apply additional security layers to digital content that is either shared through, or accessed through the analyzer.

The session timer and the token timer can be applied to the owner/administrator account, or applied to the recipient of shared digital content, at the discretion of the owner/administrator. The share timer can only be applied to recipients of shared digital content.

The analyzer can be applied to, or incorporated into any system that provides storage for digital content such as a hard drive, USB drive, server or other entity where digital content can be stored. The analyzer can be configured to protect the entire device or drive, or can be configured to protect only specified files, folders or directories. Additionally, more than one instance of the analyzer can be assigned to a single device. This (as an example) would allow a digital content owner to allow multiple recipients to access different sections (or folders as an example) within the same device or drive. Each application of the analyzer will separately control and protect each area of digital content it is assigned to. Each application of the analyzer will have an independent timer (share, token and session) and independent access permission and password configurations.

It's important to note that while other aspects of operation and functionality exist within the system, they have been purposely omitted to provide focus and clarity for the primary functional elements.

The primary components of the analyzer will now be discussed with reference to FIG. 1. FIG. 1 is a block diagram representing the analyzer 105 and its framework and key components. As can be seen in FIG. 1, the analyzer 105 contains an operating system 110. The operating system 110 provides an environment where the analyzer 105 can execute its instructions/operation. The analyzer 105 also contains a timer manager 115, a PIN authentication module 120 and a token manager 125. These three elements work in conjunction with the operating system 110 to manage the secured access sessions provided within the analyzer 105. The timer manager 115 controls the access timeframes defined by the digital content owner/administrator for the share timer, secure session timer and the token timer. The token manager 125 governs the creation and management of tokens used to gain access to secured content and initiate secured sessions. The token manager 125 works in conjunction with the operating system 110 and the timer manager 115 to control the timeframe(s) wherein a token is considered valid and active (as described in detail in discussions on the "token timer" found later in this submission).

The database management 135 provides information pertaining to the storage location of digital content as well as the existing access rights set by the owner or administrator of the digital content. The active notification and messaging module 130 provides communication functions between the analyzer 105 and the external users (not shown) engaging the system. Client authentication 140, session ID management 145 and Owner Authentication 150 are provided to allow external users (not shown) to gain access to the analyzer. The client authentication 140 serves as the authentication module that manages access to the system from a client port. The owner authentication 150 serves as the authentication module that manages access to the system from an owner or administration port. These modules are significantly different because the client authentication module 140 is used solely to engage a recipient of a share or of a file transfer, where the owner authentication module 150 is used to engage the content owner and/or administrator managing the content being protected by the analyzer 105.

The session ID management 145 manages the connection between the client authentication module 140 and the database management 135 where the content storage control is hosted. Each session has a different ID to ensure that the digital content being accessed or shared matches the recipient the content was shared with. If the client authentication 140 does not match with the session ID management 145, the connection to the database management 135 will not be established, and the digital content being shared will not be accessible. This authentication provides an additional layer of security for digital content being stored and shared through the system.

The analyzer also provides a system communications interface module 160 that controls input commands and routing from users engaging the system. The client command control 155 works in conjunction with the client authentication module 140 through the system communications interface 160. The owner command control module 165 works in conjunction with the owner authentication module 150 through the system communications interface 160. The communications interface 160 may comprise or control one or more wired or wireless network interfaces or other communication devices.

The component modules provided in FIG. 1 work together to form the framework of the analyzer 105. By separating the client command control 155 and client authentication 140 from the owner command control 165 and owner authentication 150 the analyzer 105 provides added levels of security and protection for digital content protected by the system.

The analyzer provides the capability to create a "session" for accessing the digital content. The session is the timeframe that the content will be accessible through the system, by the person(s) authorized within the analyzer to access the digital content. The access sessions are controlled by the owner of the digital content, and can be passed to the recipient of the digital content. As an example, the owner of digital content (e.g. a folder) may choose to share that folder with a client/recipient. The owner of the folder can set a session access timer to limit the amount of time the folder is accessible to the client/recipient. Further, the owner may choose to change this timer at any time, even after the initial setting and activation of the timer has begun. The owner of the digital content (folder) may also choose to allow the client/recipient of the shared folder to extend their access to the folder by allowing the client/recipient to extend the session. The client/recipient extension of a session is discussed later in this submission.

The session protocol for the analyzer is structured to allow users of the system to create an identity within the framework, allowing a primary (tier 1) type access to the shell of the system. Within this framework, parties can share electronic data in a secure environment. In addition to the primary access established during the identity creation process, a secondary (tier 2) access is provided to enhance the security and privacy of data further. The secondary (tier 2) access utilizes the PIN created during the identity creation process, coupled with a token system that delivers a single-usage type digital passcode for system access. In addition to the token, the system utilizes session identification (ID) to verify that the token request is valid and matches the PIN generation location. The session ID is sent to the analyzer along with the PIN to ensure the session ID matches the session created when the primary (tier 1) access was validated. This additional step ensures positive identification and certification prior to enabling access to digital content protected by the analyzer.

Figure 2A:
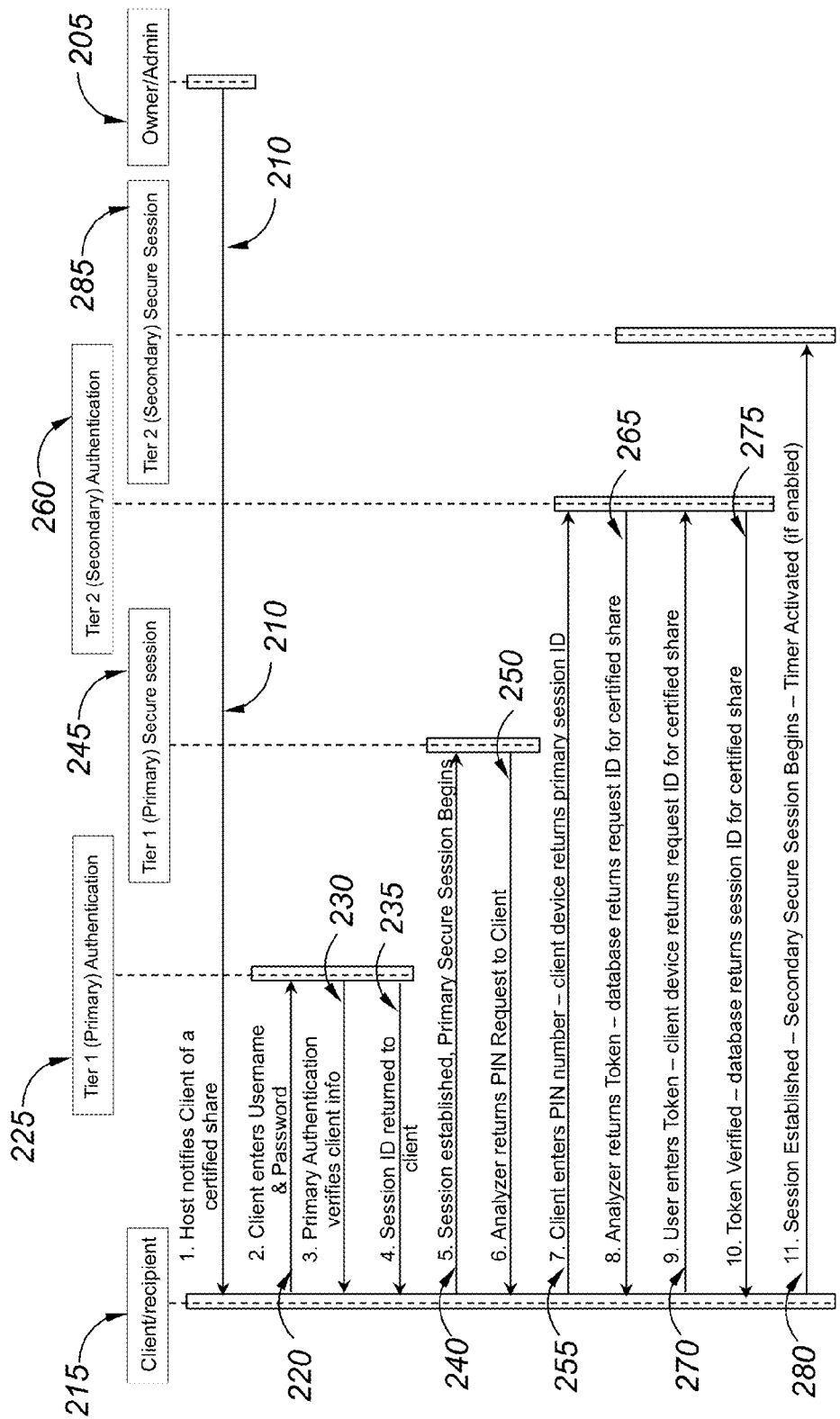
FIG. 2A is a diagram of the session protocol for authenticating a recipient of shared digital content.

The session protocol for the analyzer will now be discussed with reference to FIG. 2A. The process depicted in FIG. 2A shows a general usage scenario wherein one person wishes to share digital content with another person. The scenario depicted in FIG. 2A assumes both the owner/administrator and client/recipient have created primary user identities within the analyzer. It is not required for a client/recipient to be a registered user to receive the notification that digital content is being shared, but it will be required for them to access the digital content. An explanation of system utilization where the client/recipient 215 is not a registered user of the system is provided later in this submission.

Referring to FIG. 2A, the process begins when the owner/administrator 205 shares digital content with the client/recipient 215. The share notification 210 can come in the form of an email, an SMS generated by the analyzer, a text message or other commonly known form of providing a notification or message within a digital environment.

As the client/recipient 215 activates the link provided in the notification 210, the primary authentication process begins. The analyzer will prompt the client/recipient 215 to enter a username and password 220. As the username and password 220 are entered into the analyzer, the primary authentication module 225 will validate the username and password 230 as being registered within the system and return a session ID 235 to the client/recipient 215. Upon receiving the session ID 235 from the primary authentication module 225, the primary session 240 is established between the client/recipient 215 and the secure session module 245. This step begins the primary secure session 245. The analyzer secure session module 245 now returns a PIN request 250 to the client/recipient 215. The purpose of this PIN request is to allow the client/recipient 215 to proceed into the secondary (tier 2) secure session 285. If the client/recipient 215 chooses to deny the request for PIN, they will remain in their primary secure session, but not be able to access the digital content provided in the certified share notification 210 shared by the owner/administrator 205.

As the client/recipient 215 enters their PIN, the client device returns the PIN and the primary session ID 255 to the secondary authentication module 260. This step is vital to the process because the primary session ID 255 being returned during PIN authentication must match the primary session ID provided to the client/recipient 215 during the tier 1 (primary) authentication step 235.

The tier 2 (secondary) authentication 260 module now returns a token 265 and a request ID for the certified share session to begin. The request ID notifies the client/recipient 215 of the location of the digital content provided in the owner/administrator 205 certified share notification 210 during the initial share process. The location of the digital content is a key element in allowing the client/recipient to access the shared digital content.

The client/recipient 215 enters the token 270 information provided by the analyzer 265. As the client/recipient token information 270 is being returned to the analyzer, the client/recipient device is also sending a request for a secure session ID, so that a secure session can begin. Here again, the request ID 270 for the certified share must match the request ID 265 provided to the client/recipient 215 and client/recipient device.

The tier 2 secondary authentication 260 module verifies the token 275 and returns a session ID for the certified share. At this point, the tier 2 (secondary) secure session 285 is active and a session timer begins. The client/recipient 215 now has access to the digital content shared by the host 205. The session 280 is established and the secondary secure session begins 285.

If the share timer is enabled on this share, the share timer will become active 280 as the share is accessed by the client/recipient 215. The share will end when the timer expires. If the session timer is enabled, it will also begin as the share is accessed by the client/recipient 215. The share will terminate when the share timer or the session timer expires (assuming they are enabled). The timer with the earliest expiration time and date will govern the expiration of the share. The share timer and the session timer are explained in detail later in this submission.

The analyzer can be incorporated into existing architecture to secure and protect components of an overall larger computer based system. Specifically, while other protection methodologies protect at the system level, the analyzer can protect down to the file level. The architecture of the analyzer allows for multiple protection instances to appear within the same digital infrastructure. This allows for the protection of files, folders, directories, sub-directories, individual USB or external drive ports, and the sub-folders, directories and files of these USB enabled devices.

As described above, the analyzer has a primary and secondary authentication tier to enable multiple layers of protection for digital content being stored and/or shared within a digital environment. The analyzer may be configured to allow management, sharing, storing, copying, renaming and other digital content based management functions after the primary (Tier 1) authentication has taken place. As an example, the analyzer may be deployed and configured on a publically available file sharing system such as Dropbox or StoAmigo to enable a digital content owner to manage their own stored digital content immediately upon the initiation of a Tier 1 primary authentication session. The analyzer may be further configured to prevent shared digital content from being accessed by a recipient party, without the recipient party executing the Tier 2 (secondary) authentication steps. The functions taking place within Tier 1 (primary) and Tier 2 (secondary) authentication may be configured by the entity deploying the analyzer.

In the example of a publically available file sharing system as mentioned above, it would be common to allow the owner of digital content to access and manage their own content with Tier 1 (primary) authentication, but require stricter access and authentication on shared digital content by implementing a Tier 2 (secondary) authentication to gain access.

As stated previously, the analyzer can be utilized to protect systems (such as network servers, sharing servers, and storage servers) and devices (such as external hard drives, laptops, tablets, USB hard drive sticks and other devices with data storage capability). In addition to these functions, the analyzer provides protection of digital content down to the file, folder, sub-directory and directory levels. It's important to note that the analyzer can be accessed remotely from any smart-type device (smartphone, tablet, PC, laptop, etc.) so it is not necessary that the user be collocated with the system hosting the analyzer to access it.

In a typical environment wherein sharing and management of digital content takes place, the analyzer can be utilized to protect access to digital content. As previously stated, the analyzer is a software algorithm and can be installed as a component of a file sharing system or other environment wherein digital content is stored, shared, moved, copied, created, saved and otherwise managed. The analyzer can be installed on a magnetic-type drive, hard drive, solid state drive or other storage entity capable of facilitating the storage of digital content.

Figure 2B:
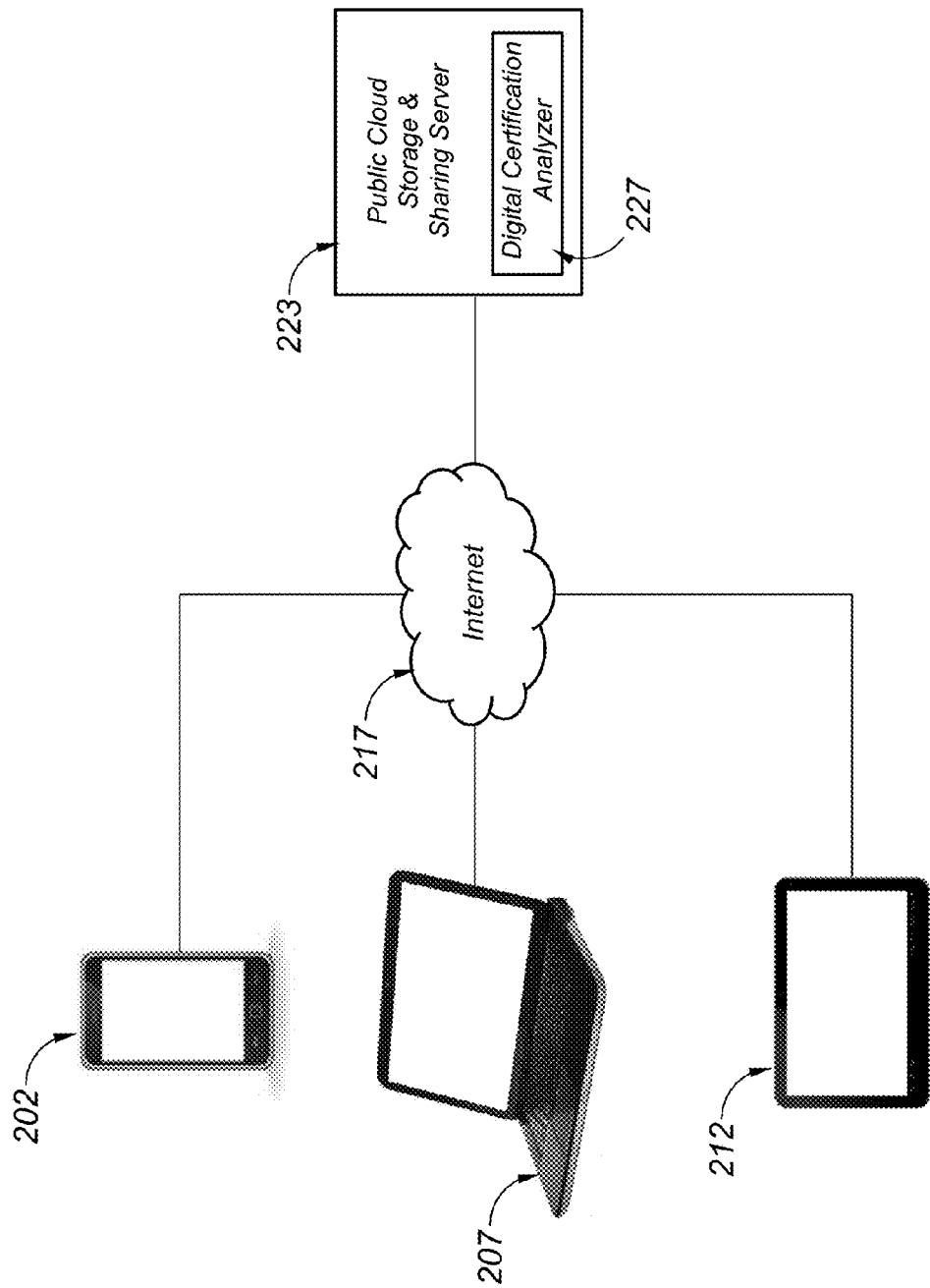
FIG. 2B is a diagram illustrating the architecture of the analyzer in use within a public cloud storage and sharing server.

A typical implementation of the analyzer will now be discussed with reference to FIG. 2B. FIG. 2B represents a typical environment wherein multiple devices and/or users are connected to a public cloud storage and sharing server through the internet. The user devices can be any smart-type device capable of interacting with the internet, and a generally known file storage and sharing system. Device types can be (but are not limited to) smartphones 202, laptop computers 207 and tablet 212 devices. Each device is connected to the internet 217 to establish connection with the public cloud storage and sharing server 223, such as via one or more communication links. One or more wired or wireless communication devices may establish and conduct such connection. The analyzer 227 has been installed on the public cloud storage and sharing server 223 to enable enhanced data protection and management.

As an example of the analyzer functionality, the smartphone 202 wishes to access their personal digital content on the public cloud storage and sharing server 223. The process to access begins by the smartphone 202 authenticating access rights by entering their respective username and password into the public cloud storage and sharing server 223. This information is sent from the public cloud storage and sharing server 223 to the analyzer 227 for verification. Once verified, the smartphone 202 may gain Tier 1 (primary) access to the digital content being stored within the public cloud storage and sharing server 223. It's important to note that the public cloud storage and sharing server 223 may set parameters as to what digital content may be accessed during Tier 1 (primary) access sessions. As an example, a Tier 1 (primary) access may grant the smartphone 202 access only to digital content that was uploaded and/or otherwise stored on the public cloud storage and sharing server 223 by the smartphone 202. Specifically, the analyzer may restrict access to other digital content, such as shared digital content that has been deemed restricted by the public cloud storage and sharing server 223.

In this example, the Tier 1 access granted may give the smartphone 202 the capability of uploading, downloading, renaming, copying and sharing of digital content that the smartphone 202 specifically uploaded to the public cloud storage and sharing server 223, but restrict other activities and access to digital content that has been shared, or deemed more proprietary by the system configuration of the public cloud storage and sharing server 223.

Continuing to refer to FIG. 2B, the smartphone 202 (as stated above) is currently engaged with the public cloud storage and sharing server 223 with Tier 1 access, as governed by the analyzer 227. The smartphone 202 now wishes to access more restricted content within the public cloud storage and sharing server 223. Here again, the restrictions placed on the content will be determined by the service provider, in this case, the public cloud storage and sharing server 223. As the smartphone 202 seeks to engage the restricted content, the analyzer 227 will notify the public cloud storage and sharing server 223 of the access attempt, prompting the analyzer 227 to send a request through the public cloud storage and sharing server 223 to the smartphone 202 for a PIN. As stated previously, the PIN is created during the registration process wherein the owner/user of the smartphone 202 creates an account with the public cloud storage and sharing server 223 that is utilizing the analyzer 227.

The owner/user of the smartphone 202 will enter the PIN, which is transmitted to the public cloud storage and sharing server 223, and the analyzer 227. The analyzer 227 will authenticate or deny the PIN as authentic, based on the information stored within the database of the analyzer. The database information (not pictured) contains details on digital content access rights, locations, permissions and other vital information governing access to protected digital content. Assuming the analyzer 227 approves the PIN that was submitted through the smartphone 202, the analyzer 227 will return a token to the smartphone 202. The token will be delivered in a manner that was determined and programmed into the analyzer 227 at the time of account creation (but may be changed at any time by the user) within the public cloud storage and sharing server 223, just as the PIN as explained above.

Once the smartphone 202 user receives the token, it may be entered into the appropriate field on the smartphone 202 user interface (not pictured) and returned to the public cloud storage and sharing server 223 and the analyzer 227. The analyzer will verify that the token matches the PIN requesting access, and access to the restricted digital content will be granted. Here again, it's important to note that the restrictions, access and permissions are determined by the public cloud storage and sharing server 223 and governed by the analyzer 227. The host system (in this case the public cloud storage and sharing server 223) may set and manage restrictions and access permissions within the analyzer 227 to achieve the desired level of security, privacy and protection of digital content.

In another example utilizing FIG. 2B, we assume that the owner/user of the smartphone 202 wishes to share digital content with the owner of the laptop 207 from the public cloud storage and sharing server 223. The owner/user of smartphone 202 wishes to protect the digital content being shared, to ensure that the recipient (laptop 207) authenticates their ownership and access rights prior to gaining access to the digital content being shared. The owner of smartphone 202 will select the digital content they wish to share with the recipient laptop 207, and select Tier 2 protection for the share. Once the Tier 2 protection is requested, the analyzer 227 will request authentication from the smartphone 202 to ensure that the person executing the command has the proper credentials to do so. Once the smartphone user 202 returns their credential validation (typically a PIN), the analyzer 227 will apply the Tier 2 protection algorithm to the digital content being shared from the smartphone 202 to the laptop 207 through the public cloud storage and sharing server 223. The smartphone 202 will now execute the share utilizing the typical sharing configuration settings contained within the public cloud storage and sharing server 223.

Once the laptop receives the share 207, they will be required to enter their Tier 1 access information, typically a username and a password. Once the Tier 1 access has been granted, the laptop 207 user will be asked to enter their specific PIN. Again, this PIN was created when the initial registration for service with the public cloud storage and sharing server 223 was initiated and the user account (representing laptop 207) was created. Once the PIN has been entered by the user of laptop 207, it will be sent through the public cloud storage and sharing server 223 to the analyzer 227.

The analyzer 227 will validate the PIN utilizing the database (not pictured) wherein permissions, access rights, digital content locations and other vital information pertaining to the digital content is stored. Once the validation of the PIN has been completed, the analyzer 227 will send a token to the laptop 207. The token will allow the laptop 207 access to the secured digital content being protected by the analyzer. Once the token has been entered, secured access is granted by the analyzer 227.

In another functional implementation of the analyzer (continuing to use FIG. 2B) the laptop computer 207 wishes to share digital content with the owner of the tablet 212. The digital content has been deemed by the laptop computer 207 as confidential, requiring Tier 2 authorization be granted by the analyzer to ensure the identity of the tablet (user) 212.

Utilizing the analyzer, the owner of the laptop 207 may initiate a share through the public cloud storage and sharing server 223, with the user of the tablet 212, that requires additional (Tier 2) authorization. As the laptop 207 initiates the share with the tablet 212, the laptop 207 will notify the analyzer that the shared digital content is proprietary and requires additional authentication of access rights (through the analyzer 227) to access the shared digital content.

As the recipient tablet 212 receives the share notification, they will initiate access. If the recipient tablet (owner) 212 is currently logged into the public cloud storage and sharing server 223 (via the analyzer 227), the recipient tablet 212 will be prompted to enter their PIN as an initial step in validating their access permissions to the shared digital content. If the recipient tablet 212 is not currently logged into the public cloud storage and sharing server 223 (via the analyzer 227) they will first be required to enter their Tier 1 access as described above in the first example.

Once the recipient tablet 212 enters their PIN, the analyzer 227 will analyze and validate the PIN via the database (not pictured) and reply through the public cloud storage and sharing server 223 to the recipient tablet 212 with a token. The recipient tablet 212 will be prompted by the analyzer 227 to enter the token in the appropriate field, which will then be returned to the analyzer 227. Utilizing the database (not pictured) within the analyzer, the token returned by the recipient tablet 212 will be compared to the digital content request, the digital content permissions and access rights, and the digital content physical location to determine if the token received is valid. Assuming the token is validated, the analyzer 227 will instruct the public cloud storage and sharing server 223 to grant access to the recipient tablet 212 for the shared digital content. It's important to note that access granted will be governed by the permission and access settings within the analyzer 227, as set by the laptop 207 initiating the share. These permissions may be programmed and configured by the host public cloud storage and sharing server 223 at the time of implementation of the analyzer 227 software.

As discussed previously, the analyzer provides the capability of protecting digital content within a digital realm, such as a file sharing system or other server in which digital content may be stored, accessed and/or shared between one or more recipients. The analyzer may be utilized by an individual user to protect their personal digital content stored in the cloud (as an example), or may be utilized to analyze and authenticate the identity of a recipient of shared digital content.

In a typical application of the analyzer, it may be installed on a file sharing server wherein digital content is stored, accessed and/or shared. These file sharing servers are typically located in the "cloud", where security issues are of grave concern since users and businesses typically do not have any control of the server, or whom may have access to it. In the following example, the analyzer is installed in a public cloud storage and sharing server, and accessed remotely through the use of a smartphone. The communication and command interaction of the analyzer as deployed within a public cloud storage and sharing server will now be discussed with reference to FIG. 3A.

Figure 3A:
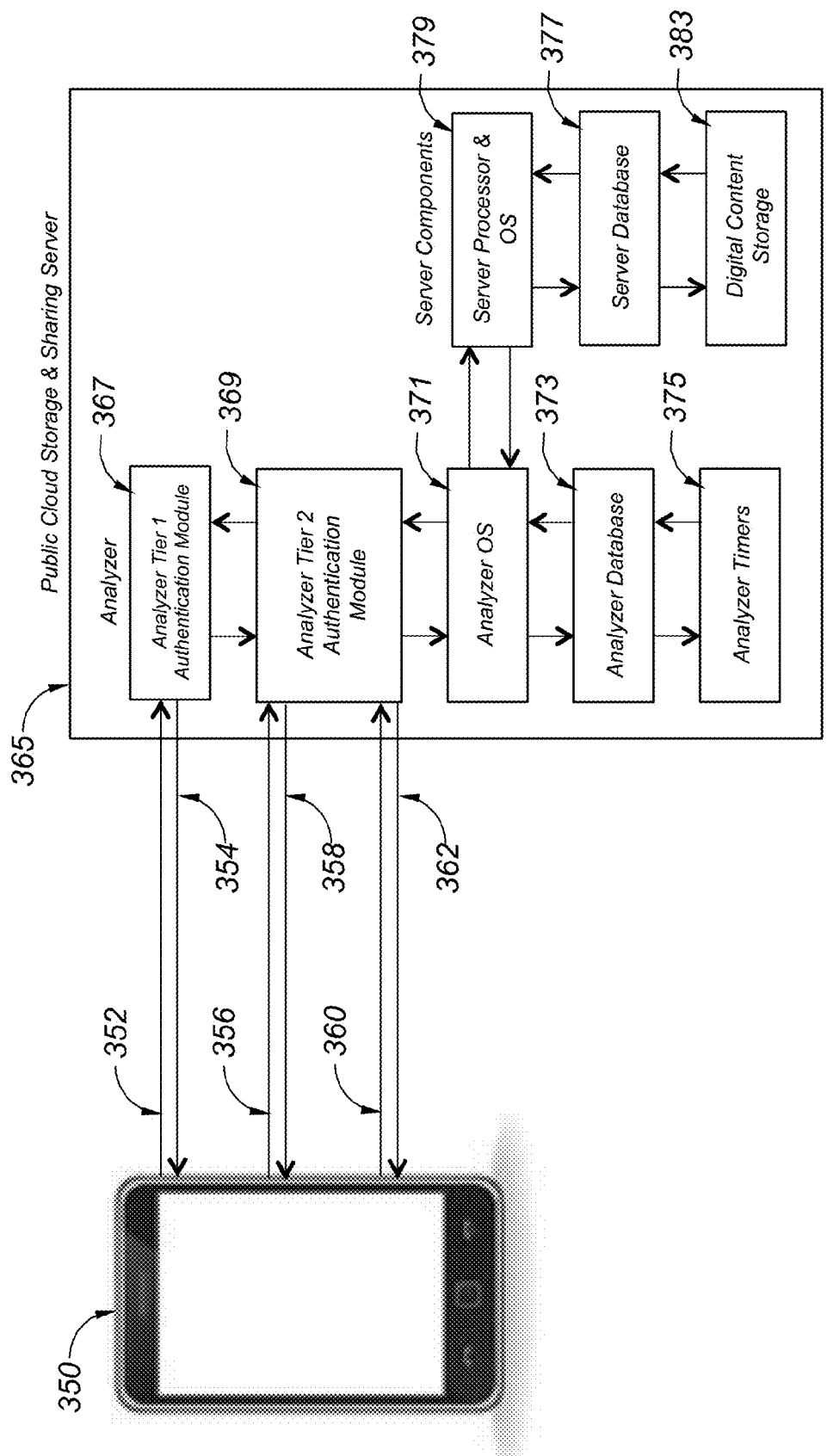
FIG. 3A is a diagram illustrating the storage device locking configurations.

FIG. 3A shows the communication and command interaction of a typical smartphone 350 seeking to connect to digital content stored within a public cloud storage and sharing server 365. While the smartphone 350 is used in the following example, any device capable of engaging the public cloud storage and sharing server (such as a PC, tablet, laptop or other computing device) may be used.

The initial communication takes place wherein the smartphone 350 accesses the public cloud storage and sharing server 365 by entering their login 352 information. The login information typically consists of a username and a password, and is passed to the public cloud storage and sharing server 365 to the analyzer Tier 1 authentication module 367. The analyzer Tier 1 authentication module 367 communicates with the analyzer operating system 371, and with the server processor and operating system 379 to obtain information from the server database 377, validating the account information entered by the smartphone 350. Once the server database 377 validates the account is present on the server and that the login information entered 352 is valid, the analyzer Tier 1 authentication module 367 will return a confirmation and a Tier 1 session ID 354 to the smartphone 350. This will begin the Tier 1 session, allowing the smartphone 350 to access to their personal digital content stored in the public cloud storage and sharing server 365 (digital content storage 383). It's important to note that the digital content storage 383 houses all digital content referred to in this example. In some cases, digital content may be accessible via Tier 1 (367) authentication, where as other digital content may require Tier 2 (369) access. The permission (Tier 1 or Tier 2) is placed on the digital content individually, and not on the container (digital content storage 383). The analyzer timers 375 will be initiated as the Tier 1 session ID 354 and authentication is returned to the smartphone 350. The timers are configured and set by the administrator of the public cloud storage and sharing server 365, and may be enabled/disabled as required. For the purpose of this example, we assume the timers are enabled and will allow the smartphone 350 to engage with the public cloud storage and sharing server 365 until a period of extended inactivity or smartphone 350 logout occurs. The timer configuration information is stored in the analyzer database module 373 and configured by the public cloud storage and sharing server 365 administrator(s).

Now that the Tier 1 session is active, the smartphone (user) 350 may request Tier 2 activation, enabling the smartphone (user) 350 access to more secure content. Here again, it's important to note that the content deemed to be more secure is controlled by the public cloud storage and sharing server 365. For this example, we will assume that the smartphone (user) 350 wishes to access personal digital content stored within the digital content storage 383 that they themselves (smartphone 350) deemed proprietary, and have required Tier 2 access for anyone (including themselves) trying to access the digital content.

As the smartphone (user) 350 initiates access to the digital content held in the digital content storage 383, protected under Tier 2 authorization, the analyzer operating system 371 working in conjunction with the server processor and operating system 379 will notify the smartphone (user) 350 that the digital content (stored in the digital content storage 383) is protected, and additional authorization is needed. The smartphone (user) 350 will enter their PIN 356 which will be sent to the analyzer Tier 2 authentication module, along with the Tier 1 session ID that was assigned by the analyzer Tier 1 authentication module during primary (Tier 1) access.

Assuming the PIN and Tier 1 session ID are validated by the analyzer Tier 2 authentication module 369, the analyzer Tier 2 authentication module 369 will return a token 358 to the smartphone 350 as a confirmation of authentication. The smartphone (user) 350 will then be prompted to enter the token received from the analyzer Tier 2 authentication module 369 into the associated field (not shown).

The smartphone 350 will return the token 360, along with the Tier 1 session ID (previously assigned) as a validation that the smartphone 350 is authorized to access the restricted digital content stored within the digital content storage 383. The Tier 1 session ID is returned along with the token to validate the location of the device requesting access to the digital content. This step adds an additional layer of security to the digital content by ensuring that the device that established the Tier 1 session is the same device that will be granted Tier 2 authentication.

Assuming the token returned 360 to the analyzer Tier 2 authentication module is valid, and matches the Tier 1 session ID that is also returned 360 at the same time, the analyzer will provide a confirmation and a Tier 2 session ID 362. The smartphone 350 has now established Tier 2 secured access to the digital content stored within the digital content storage 383. The analyzer timer 375 will start, enabling the public cloud storage and sharing server 365 the ability to govern the amount of time the Tier 2 access will be valid. The analyzer timers 375 may be controlled and set by the administrators of the public cloud storage and sharing server 365, or the permissions to set and control the analyzer timers 375 may be granted to the digital content owner, in this case the smartphone (user) 350. Allowing the user (smartphone 350) to control the analyzer timer(s) 375 enables the user (smartphone 350) to initiate a share with one or more recipients, wherein the access to the digital content may be managed by the user (smartphone 350). One such case may be an instance where digital content (such as a college exam) is to be made available to one or more student recipients for a specified period of time. Once that time has elapsed, access to the digital content would expire.

Figure 3B:
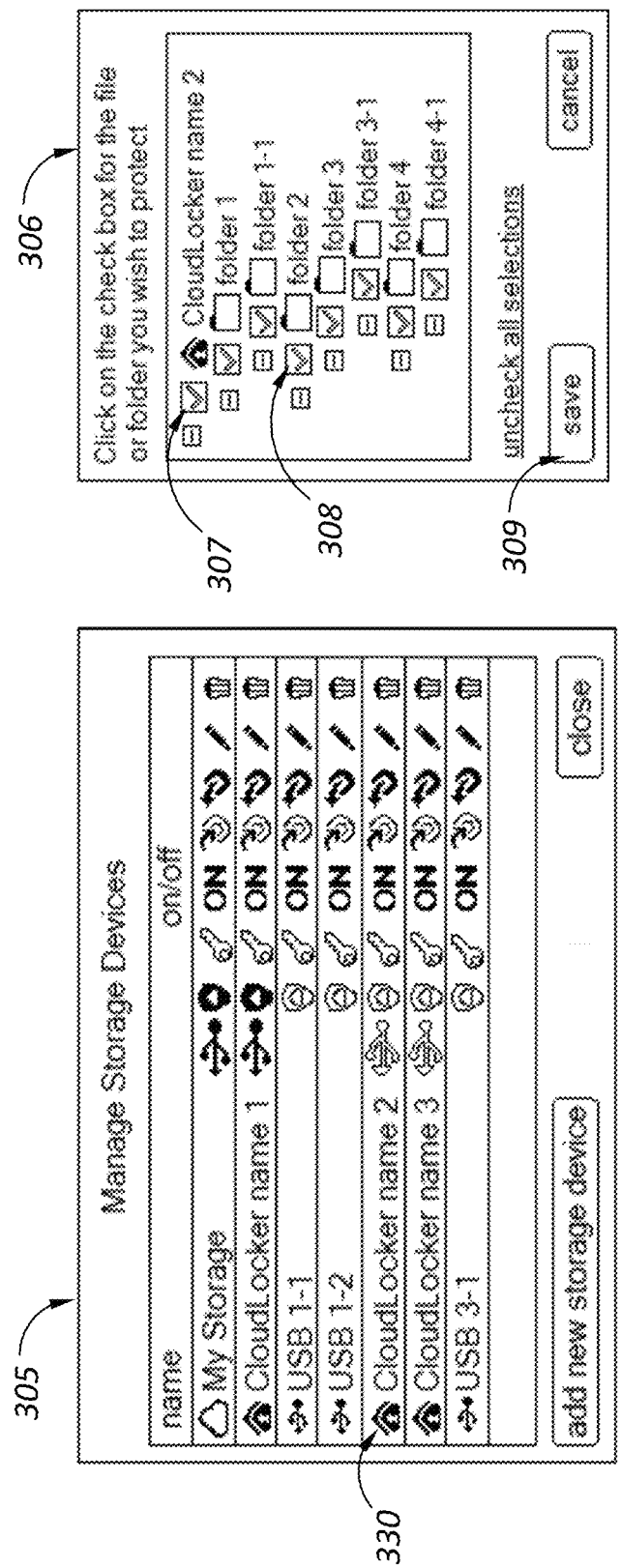
FIG. 3B is a diagram illustrating communication and command interaction.

Please note that the screen shots utilized in FIG. 3B show the analyzer used in conjunction with a cloud storage service (StoAmigo). While other configurations of the analyzer exist, the cloud storage representations were used for the ease of explanation.

Details of the protection methods and locking configurations of the analyzer will now be discussed with reference to FIG. 3B. FIG. 3B, reference 305 is a screen shot of the analyzer while being utilized as a component of the StoAmigo cloud storage/sharing platform. The StoAmigo platform is utilizing the analyzer to protect and secure both web-based storage (hosted in the cloud) and local storage (hosted off-cloud or on-premise).

For this example, the owner/administrator of the analyzer is applying protection to "CloudLocker name 2" 330. The owner/administrator will select "CloudLocker name 2" 330 which will open a window 306 providing details of the directory structure of "CloudLocker name 2" 330. As can be seen, check boxes 307/308 are provided next to each folder within each directory that exists in "CloudLocker name 2" 330. The owner/administrator can choose to protect the entire device with the analyzer by selecting the check box 307, or can choose to select any other directory, sub-directory, file or folder by selecting the check box (308 as an example) that appears next to digital content to be protected. Once the selection(s) are complete, the owner/administrator can save 309 their selections. Once the selections have been saved, the analyzer is active on the selected directory(s), file(s), folder(s), subfolder(s), subdirectory(s) or device(s), and can be enabled/disabled at the choosing of the owner/administrator. While the analyzer can protect an unlimited number of devices in a variety of locations simultaneously, the list of devices provided in reference 305 was limited to provide clarity. Each device managed through the analyzer can be accessed and controlled through the process detailed above.

Figure 4:
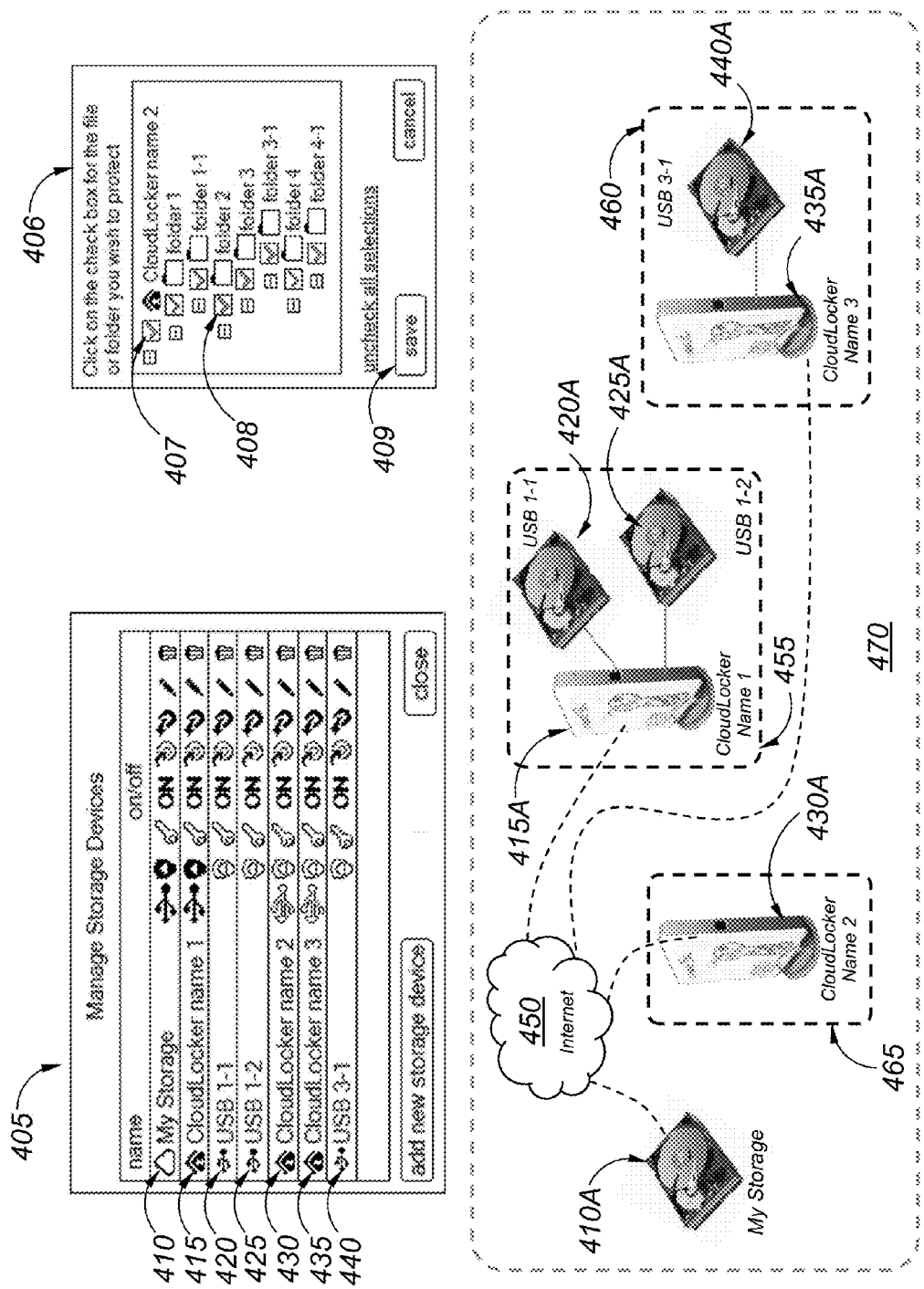
FIG. 4 is a diagram illustrating the analyzer controlling access to multiple devices.

The devices managed by the analyzer can exist in any geographic location where an Internet connection is available. FIG. 4 illustrates a typical configuration where the analyzer is used to control access to multiple devices in different locations, managed through a single owner or administrator.

Referring to FIG. 4, reference 405 is a screen shot from the StoAmigo file storage and sharing system. In the screen shot 405, the devices connected for the specific owner or administrator can be seen. These devices are "My Storage" 410, "CloudLocker name 1" 415; "USB 1-1" 420; "USB 1-2" 425, "CloudLocker name 2" 430, "CloudLocker name 3" 435, and "USB 3-1" 440.

Reference 470 of FIG. 4 shows the geographic locations of the devices being controlled from the analyzer control screen (FIG. 4, reference 405). It's important to note that these devices may or may not be collocated with each other, or with the analyzer. Since the devices being controlled are accessible through the Internet (world wide web) they can be accessed from anywhere an Internet connection exists, from an Internet capable device such as (but not limited to) a personal computer, smartphone, tablet or other smart-type device.

Each device shown in reference 470 is also shown in screen shot 405. Each device shown in reference 470 is illustrated in a specific geographic location and appended with the letter "A" to easily associate them with the references found in screen shot 405. As an example, reference 410 My Storage in screen shot 405 controls reference 410A My Storage shown in figure reference 470. Again, each physical device illustrated in reference 470 is connected to the analyzer through the Internet, and managed through screen shot reference 405.

Each physical device shown in reference 470 (My Storage 410A, CloudLocker Name 2 430A, CloudLocker Name 1 415A, USB 1-1 420A, USB 1-2 425A, CloudLocker Name 3 435A and USB 3-1 440A) are all managed and controlled from screen shot reference 405 utilizing the associated device names shown in the screen shot. Additionally, geographic locations (Home 465, Office A 455 and Office B 460) are provided to demonstrate the capability of the analyzer to manage devices at multiple locations simultaneously.

Each device, their respective directories, sub-directories, files, folders and USB connected devices can be individually protected and accessed utilizing the analyzer.

Referring to FIG. 4 and utilizing the example we shared previously, we will assume the owner/administrator of the analyzer wishes to apply some protection to "CloudLocker name 2" 430A. (bottom of FIG. 4, reference 470, home 465). Utilizing the screen 405 shown, the owner or administrator will select "CloudLocker name 2" 430 which will open a window 406 providing details of the directory structure of "CloudLocker name 2" 430. As can be seen in screen shot 406, check boxes 407/408 are provided next to each folder within each directory that exists in "CloudLocker name 2" 430. The owner or administrator can choose to protect the entire device with the analyzer by selecting the check box 407, or can choose to select any other directory or sub-directory, file or folder by selecting the check box 408 that appears next to the directory file or folder name. While each check box shown in 406 can be selected, the example was limited to check boxes 407 (entire device) and 408 (any file or folder) for ease of explanation.

Once the selections have been completed, the owner/administrator can save 409 their selections. Once the selections have been saved, the analyzer is active on the selected directory, file, folder, subfolder, subdirectory or device, and can be enabled/disabled at the choosing of the administrator.

As previously stated, the analyzer allows the digital content owner to protect their files, folders, directories, USB enabled storage devices and other digital content storage facilities. In addition to the protection of the storage itself, the analyzer provides protection for digital content when transferred or shared with recipients. The analyzer can "lock" content during a share session, requiring the recipient to certify their identity and authorization to access the digital content, prior to being granted access.

The analyzer protects digital content being shared between two or more users (e.g. one content owner and one content recipient) by requiring a series of certification steps to be performed by the recipient as dictated by the digital content owner (or system administrator). As we discuss FIG. 5, we will assume there is one digital content owner and one recipient to ease understanding of the process and provide clarity to the uniqueness of the system and its implementation. We will now discuss the certification process of the recipient of a share (shared digital content) through the analyzer.

Figure 5:
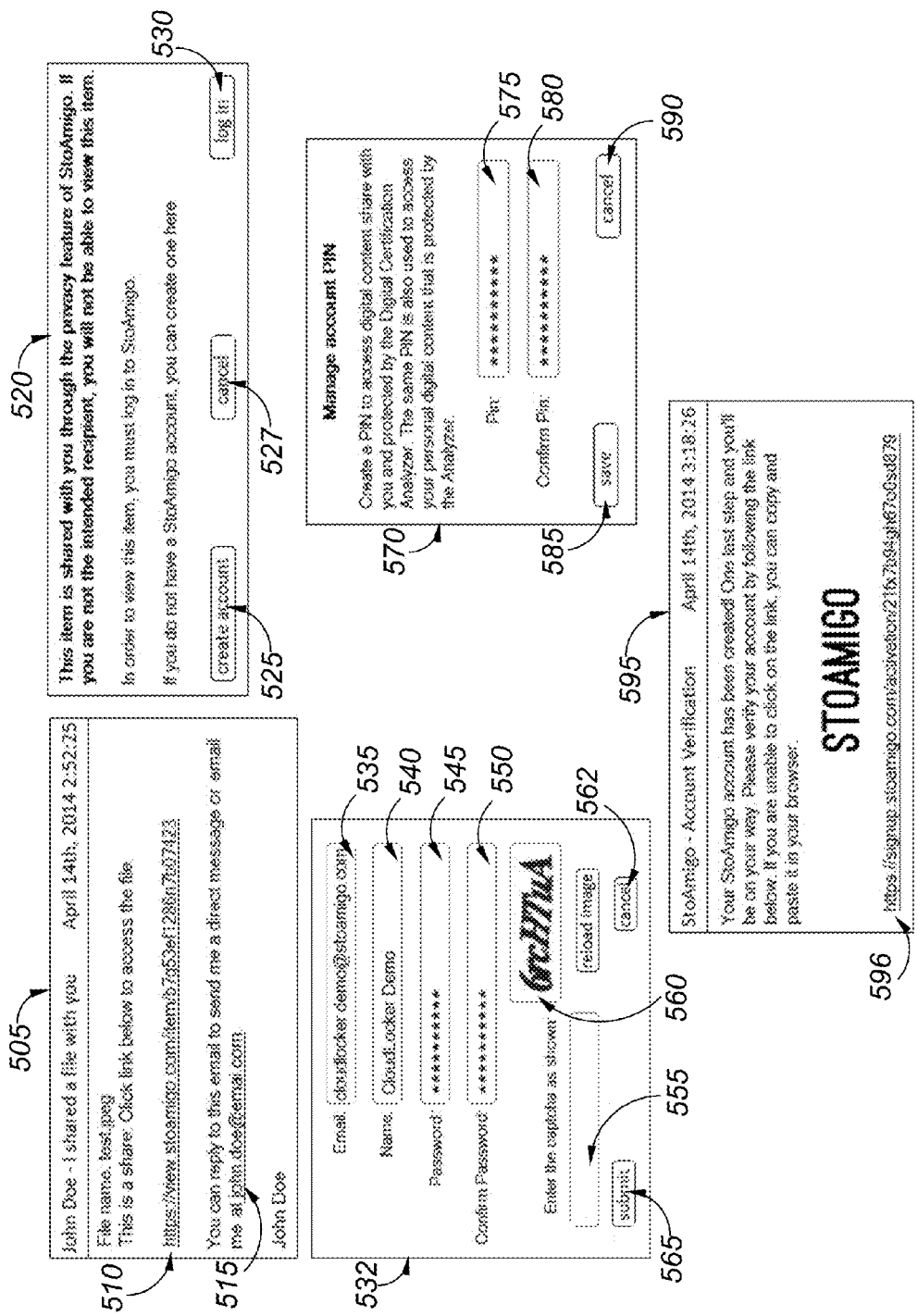
FIG. 5 is a diagram illustrating account creation within the analyzer.

FIG. 5 is a series of screen shots taken from StoAmigo's file sharing system that is utilizing the analyzer. In the following example with reference to FIG. 5, we will assume the recipient of the shared digital content is not registered with the analyzer, and is therefore unknown to the system.

Referring to FIG. 5, the process begins by the recipient of shared digital content receiving a share notification 505. While the share notification 505 is in email form in this example, it can also be sent in other common communication methods including SMS, text messaging, digital chat (such as skype) and other communication methods. The recipient of shared digital content receives the notification 505, alerting them that digital content has been shared with them. If the recipient chooses to view the content, they can open the link 510 provided in the notification 505. They can also choose to reply to the message by notifying the sender utilizing the info provided 515.

As the recipient accesses the link 510, a new window 520 opens, prompting them to either create an account 525 or to login to the system 530 assuming they have an account. For the purpose of this explanation, we will assume the recipient does not have an account, and therefore must proceed to create an account 525.

Once the recipient selects "create account" 525, a new window 532 opens. The recipient will then be prompted to enter their email address 535, their name 540, a password 545 and a confirmation of the password entered 550. It's important to note that the email address 535 entered must match the email address that received the notification 505, or the recipient will not be able to gain access to the shared digital content.

Once the above information has been entered by the recipient, they will be asked to verify a captcha 560 (to ensure they are not another digital entity trying to gain access to the system) and be asked to enter the captcha info 560 into the appropriate space 555. Once this step is completed, the recipient can select submit 565.

Assuming the analyzer accepts the information as entered above, a new window 570 will appear, prompting the recipient of the shared digital content to create a PIN 575 and confirm the PIN 580. The PIN is a Personal Identification Number that will provide a method for additional verification of the recipient of the shared digital content. The PIN can be alphanumeric, and must contain more than 6 characters for security purposes. Once the PIN has been entered, the recipient can save 585 their information or cancel 590 out of the system. A cancellation 590 will stop the process from completing.

Once the recipient of the shared digital content has selected save 585, a final email 595 will be sent to the email account 535 that the recipient used to create their account, notifying the recipient that their account information has been entered and an account has been created. The recipient of the shared digital content will need to take a final step confirming their identity by selecting the link 596 that appears at the bottom of the email 595. Again, if the email account 535 does not match the email account that received the share notification 505, the digital content will not be accessible.

Once the recipient of the shared digital content completes the authentication and sign up process by accessing the validation link 596, the sign up process is complete. The recipient of the shared digital content must now follow the steps outlined in FIG. 6 below to access the shared digital content.

Figure 6:
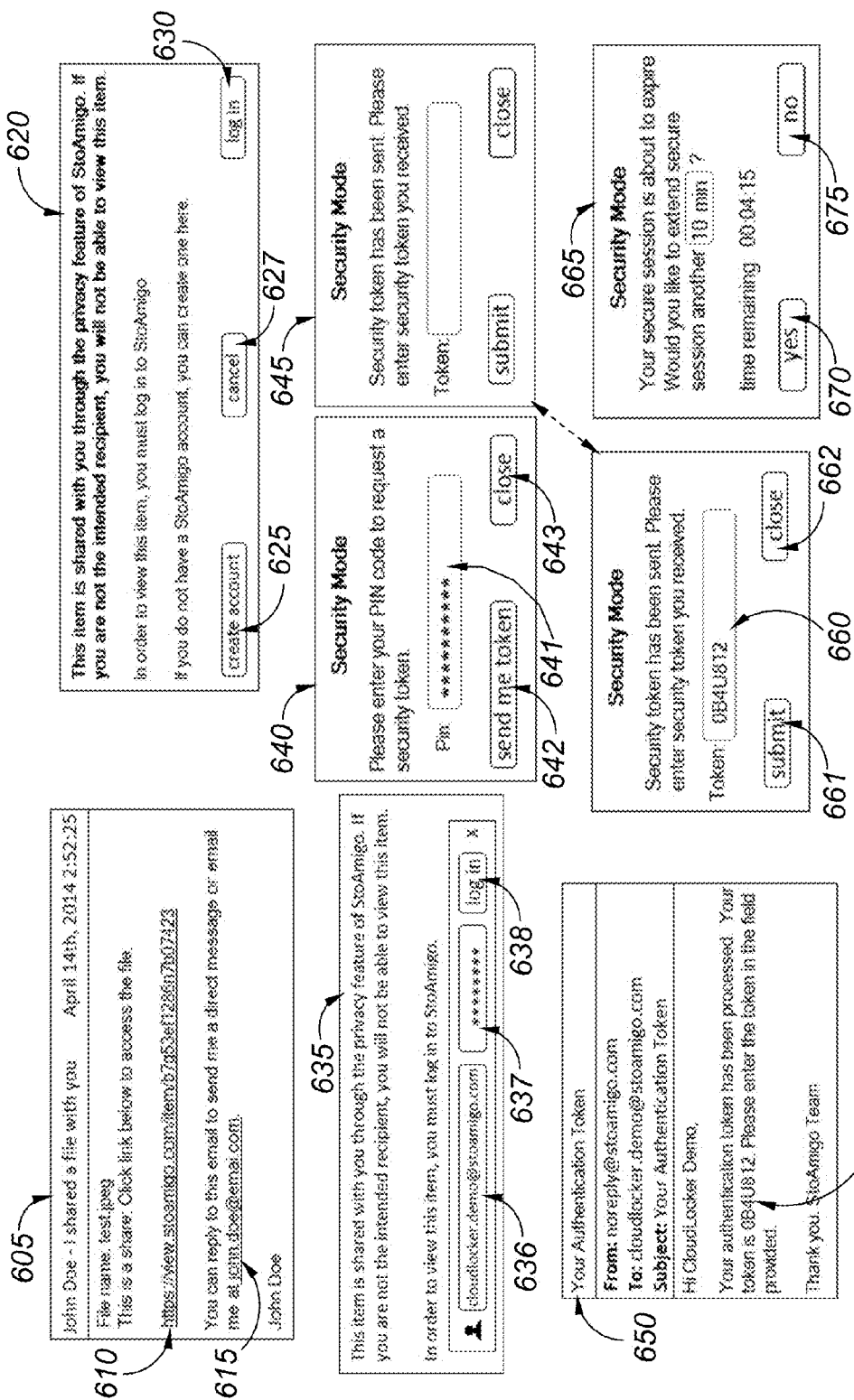
FIG. 6 is a diagram illustrating the process to access a secured share.

FIG. 6 steps through the process of accessing digital content that has been secured using the analyzer. The process detailed in the following (with reference to FIG. 6) assumes that the recipient of the shared digital content is a registered user of the analyzer, and has gone through the process outlined in FIG. 5 mentioned previously.

The process detailed in FIG. 6 assumes an owner or administrator of the analyzer wishes to share digital content with a recipient. The process will begin with the recipient receiving the notification of the shared digital content.

Referring to FIG. 6, reference 605 is a screen shot of an email notification received by the intended recipient of shared digital content. This serves as a notification to the recipient of the email that a digital content share has been initiated. The shared content is referenced by a link 610 within the notification 605, as is the email address 615 of the owner/administrator that provided the shared digital content link 610. The recipient will start the process of accessing the shared digital content by accessing the link 610 provided.

Once the recipient has accessed the link 610, a window 620 opens, allowing the recipient to create an account 625 or to log into their existing account 630. As stated previously, since we created an account with reference to FIG. 5, we will now assume the recipient has created their account. With the account created, the recipient will select to log into 630 the system.

By selecting log in 630, the recipient is presented with another window 635. In this window 635, the recipient can enter their email 636 and their password 637 to allow them to log in 638. Once the recipient has logged into the system 638, a window 640 will appear asking them to input their Personal Identification Number 641 PIN. Once their PIN 641 has been entered, the recipient will select "send me token" 642. The recipient could chose to close 643 the security mode 640 pop-up, which would terminate the secure session access.

Assuming the recipient selects "send me token" 642, a new security mode window 645 will appear to notify the recipient that the token has been sent. While the security token can be sent to the recipient in a number of various ways (including but not limited to SMS, text, Chat, email and other common methods), this example assumes an email is the method chosen by the recipient to receive their token.

The recipient receives an email 650 which was sent to the email address specified by the recipient in their sign-up process that was completed earlier with reference to FIG. 5. The token 655 is provided in the email 650 and can now be entered into the security mode window 645 in the appropriate area 660. Once the token 655 has been entered into the appropriate area 660, the recipient can select submit 661 to complete the process. The recipient at this point can also choose to close 662 the security mode 645 window, terminating the access process.

Once the token 655 has been entered into the appropriate area 660 and the recipient has submitted the token 661, an optional timer 665 may begin. The timer will be in the background during the secure access session and will pop-up shortly before the secure access session is to be terminated. Should the owner of the shared digital content choose to allow the recipient to extend their secure session, an optional button 670 will be made available to the recipient to extend their secure access session. This example 665 shows the secure session timer can be extended 10 additional minutes. This is set and controlled by the owner of the shared digital content. The recipient of the shared digital content (in this example) can select yes 670 to add 10 more minutes of secured access to the shared digital content, or can select no 675, allowing the session to terminate as initially set by the owner of the shared digital content.

Access to digital content protected by the analyzer is controlled in secured sessions. Each session has a timer that can be enabled and/or disabled by the content owner/administrator for local access, and a session timer that can be enabled and/or disabled by the content owner for remote recipient access. The local secured session access timer controls the amount of time a secured session for access will take place during content owner/administrator access. This timer allows the content owner/administrator to turn on a secured session for their own personal use, and to allow that session to expire at a predetermined time, eliminating the need to manually terminate the session.

It is not necessary to apply the timer to enable a secured session. The timer can be disabled, allowing a secured access session to occur with no expiration time assigned.

The secured session timer for remote recipient access governs the amount of time a secured session is available and active for a recipient of shared digital content. The digital content owner (at their choosing) can allow the recipient of shared digital content to extend their secure session by selecting the extension option for the session from an available pop-up window, or can choose to simply limit the amount of time a secured session can be accessed by a recipient of shared digital content, eliminating access when the timer expires. Further, the digital content owner can choose to allow the recipient of shared digital content to reestablish access to the shared digital content by re-certifying their identity through the analyzer, or can simply limit the secured session access to a single activation. This configuration would disallow further access to the shared digital content unless otherwise allowed by the owner of the shared digital content.

The owner of the shared digital content has complete control over the access to digital content, and can change access restrictions and rights at any time. They can alter restrictions before, during, or after a secured access session has begun, or choose to simply remove any and all restrictions, allowing the digital content to be shared in a non-secured environment, effectively bypassing the analyzer.

Please note that the secured access session can only be initiated through the analyzer if the user (either owner/administrator or client/recipient) has created an account (as shown in FIG. 5) and logged into that account with their default email and password. A secure access session cannot be initiated from a user that is not registered with the system.

A local secured session can be initiated by the owner/administrator by selecting a secured storage location within the protected area of the analyzer and gaining access to it. The local secure session can be optionally managed by the secure session timer (discussed in detail later in this submission), allowing the owner/administrator to set termination time for the secure session. Once the secure session has terminated, the content will again be locked down by the analyzer, requiring the owner/administrator to re-authenticate their access rights to gain additional access to the digital content.

Figure 7A:
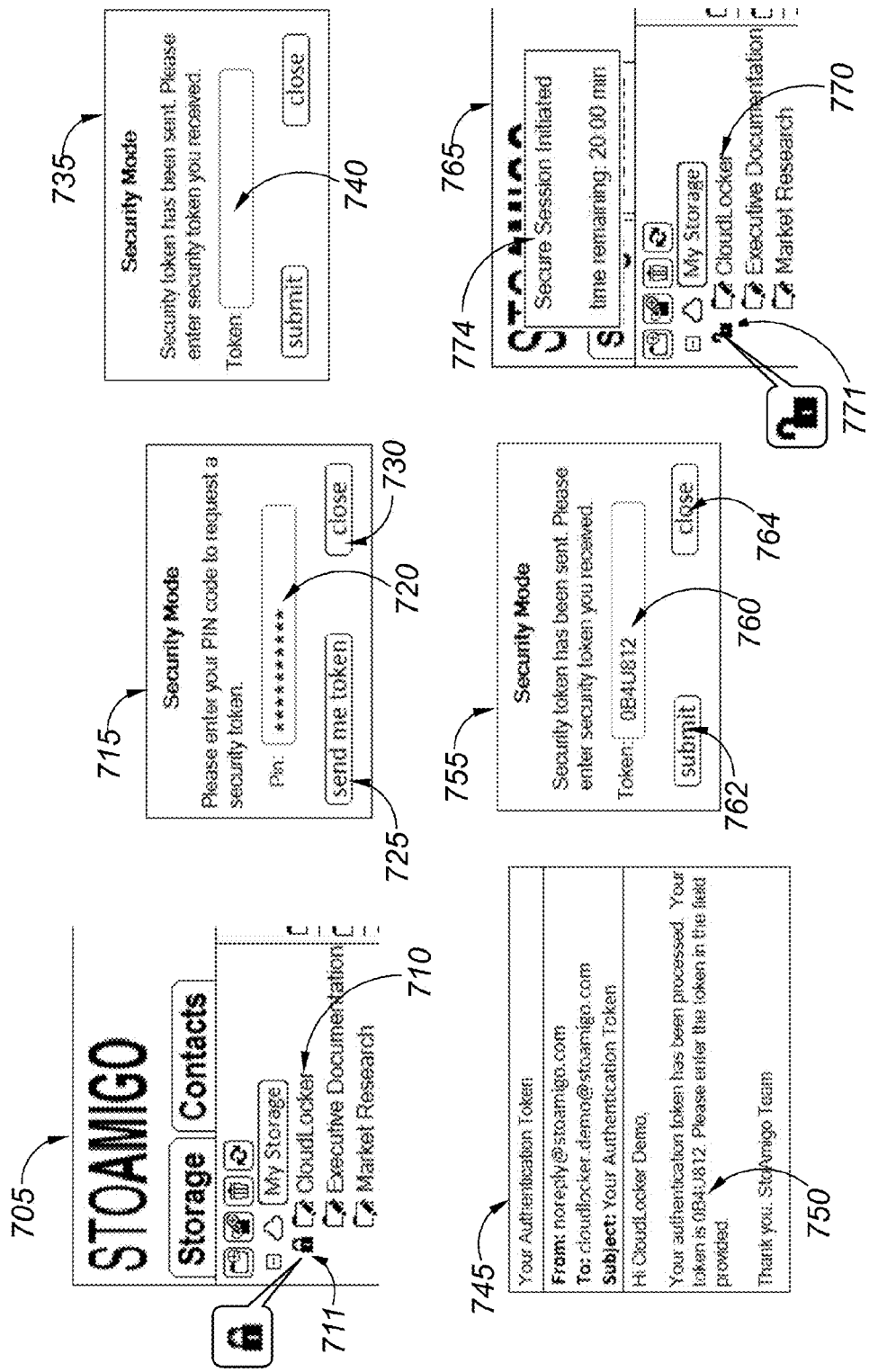
FIG. 7A is a diagram illustrating the process of initiating a secure session.

The initiation of a local secured session will now be discussed with reference to FIG. 7A. As can be seen in FIG. 7A, 705, we've previously applied the analyzer to the folder "CloudLocker" 710. The lock icon 711 next to the folder CloudLocker 710 serves as a visual indication that the digital content is locked and authentication will be required to gain access.

As the owner/administrator selects the CloudLocker 710 folder, a new window 715 appears, requesting the owner/administrator enter their PIN code. Each registered user (owner/administrator or client/recipient) will only have a single PIN, created during their registration process.

The owner/administrator enters their PIN in the space provided 720 and selects "send me token" 725. If the owner/administrator chooses to terminate the process at this point, they can select close 730, which will close the window 715 and return them to the main menu screen 705. Once the PIN has been entered 720 and the token request 725 has been made, a new window 735 opens, indicating that the security token has been sent, and that it may be entered into the space provided 740. The owner/administrator will receive the token by a method chosen previously (not shown in this submission). It is noted that a PIN may be received/transmitted via a different communication link relative to the token.

For example, an email 745 may be used to communicate the token. As the owner/administrator opens their email 745, they will see the token 750 provided. The token 750 can now be entered into the security mode 755 window in the space provided 760. The owner/administrator may now select submit 762 and the security mode window 755 will close. The owner/administrator will be returned to the main menu screen 765. As can be seen, the main menu screen 765 shows the CloudLocker 770 folder is now unlocked. The lock icon 771 shows the lock as being unlocked. The local secure session may now begin. The contents of the CloudLocker 770 folder are now unlocked and can be accessed by the owner/administrator.

If the secure session timer is enabled, the local secure session (described above) will be governed by the time limitations set forth in the secure session timer. A message 774 will appear on the menu screen 765 as an indication that the secure session has begun. The message 774 will indicate the secure session time remaining before the secure session will expire. The time remaining is programmed in the secure session timer settings discussed later in this submission.

The timers provided by the analyzer work in conjunction with the host device software and hardware (typically a file sharing server or other digital content storing and sharing facility) to ensure the tokens, sessions and sharing is protected and controlled by the analyzer. The following FIG. 7B will discuss the relationship between the host server and the timer modules functioning within the analyzer.

Figure 7B:
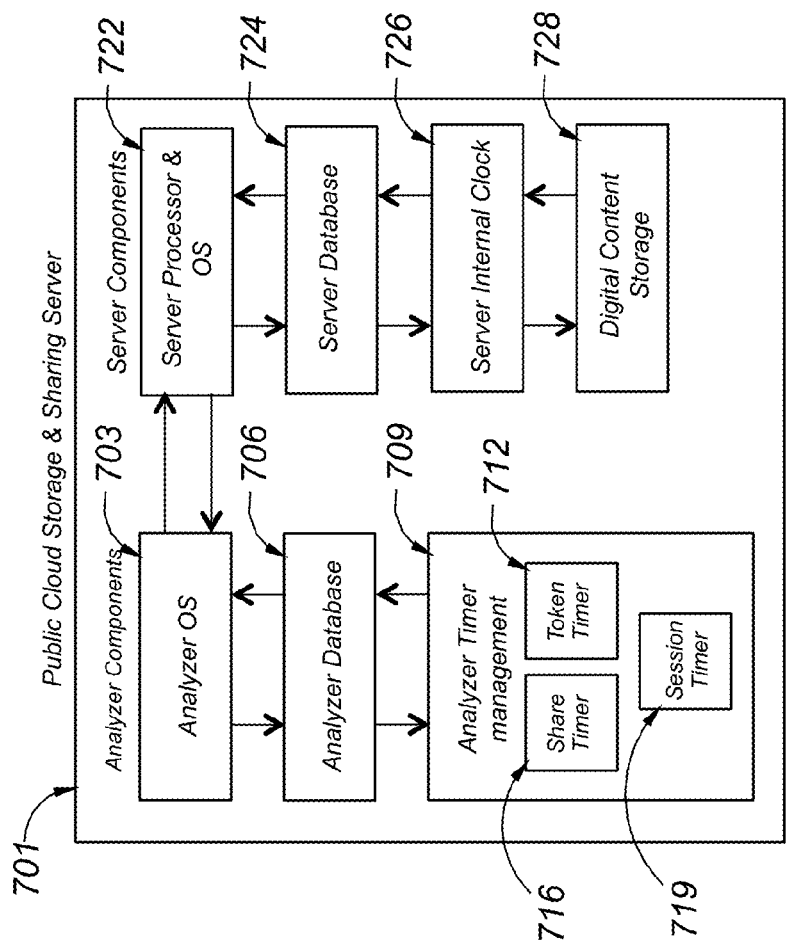
FIG. 7B is a diagram illustrating the share, session and token timers.

Please note that the components shown in FIG. 7B have been minimized to ease understanding. Only components within the analyzer and host server that directly relate to timer management have been included. FIG. 7B also assumes the analyzer has been installed on the host server. Please refer to FIG. 7B now.

As can be seen in FIG. 7B, reference 701 is a public cloud storage and sharing server, wherein the analyzer has been installed. Since this discussion will be referencing the analyzer timer management 709 modules (share timer 716, token timer 712 and session timer 719) other components of both the server and the analyzer have been removed. The primary server components that work in conjunction with the analyzer timer management 709 and its subset modules are the server processor and operating system 722, the server database 724, the server internal clock 726 and the digital content storage 728.

Upon initial installation of the analyzer, the analyzer operating system 703 will communicate directly with the server processor and operating system 722 to engage the server internal clock 726 for the purpose of synchronizing with the internal server clock of the public cloud storage and sharing server 701. The analyzer timer management 709 will continue to communicate with the public cloud storage and sharing server 701 internal clock 726 to ensure synchronization.

Functionally, the timers (share timer 716, token timer 712 and session timer 719) work entirely independently and in full synchronization with the server internal clock 726, and are managed by the analyzer timer management 709. Each time a user initiates a command through the analyzer wherein a timer is activated, the details of the timer actuation, digital content engagement and other details about the command sequence are stored in the analyzer database 706. This enables the analyzer to manage an unlimited number of shares, digital content access sessions and other functional and operational aspects pertaining to the engagement of the digital content stored 728 within the public cloud storage and sharing server 701.

As stated previously, timers are provided to govern (a) the length of time a secure session will last, (b) the length of time digital content shares will be available and (c) the length of time a token will remain valid for authentication purposes. The local (owner administrator) secure session timer will now be discussed with reference to FIG. 8A.

Figure 8A:
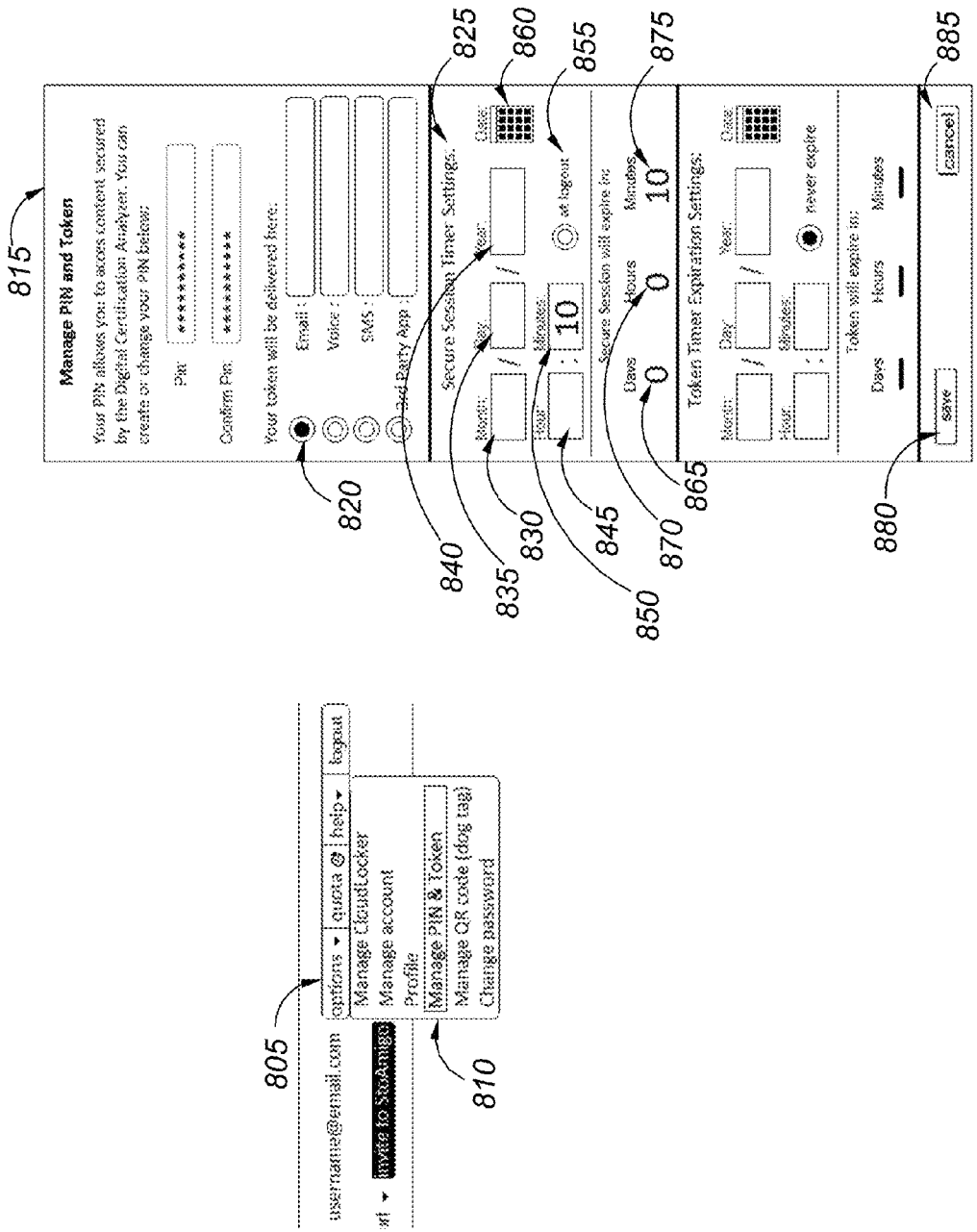
FIG. 8A is a diagram illustrating details and functionality of the local (owner/administrator) secure session timer.

As can be seen in FIG. 8A, the local secure session settings are managed through an interface screen 815 that provides a variety of functions to enable the owner/administrator to customize the analyzer to meet their specific needs. The owner/administrator can access the settings of secure session timer in the analyzer from the options 805 menu. By selecting Manage PIN & Token 810, the owner/administrator will open a window 815 that provides the detailed settings for the analyzer. While the Manage PIN & Token interface menu 815 provides a number of various functions and settings, we will focus on those that apply specifically to this submission. As can be seen in FIG. 8A, reference 815, the owner/administrator has the option to select where their token will be delivered. For this example, the setting chosen is the email 820. It's important to note that the email address utilized for token delivery must match the email address utilized during the registration process of the analyzer or the authentication will fail. This is to ensure that only the owner/administrator can receive a token for access to their account. While not shown, similar validations are provided for the other contact methods (voice, SMS and $3^{rd}$ party apps).

The secure session timer settings 825 can be configured to provide the exact date and time for a secure session to expire. This provides the maximum amount of versatility when engaging the timer. The owner/administrator can select the month 830, day 835 and year 840 of the expiration of the secure session, as well as the hour 845 and minutes 850. It is not necessary to populate a date unless the owner/administrator chooses to. The secure session timer will automatically populate the date fields if the hour 845 and minutes 850 exceed the end of the calendar day. The analyzer provides a clock that records the time and date automatically, and will update the secure session timer settings accordingly. The secure session timer ensures that digital content accessed during the secure session is re-locked or otherwise re-secured upon completion of the session. By setting a timer, the owner/administrator can preset the termination of a secure session to ensure that the digital content will be re-locked or re-secured, even if they forget to log out of the system. The owner/administrator can choose to allow the secure session to continue until they logout 855, exiting the system. This setting will disable the previously mentioned secure session timer settings.

To ease the selection process of the expiration date of the secure session timer, a calendar mode 860 is available so the administrator or digital content owner can select the appropriate date from a calendar (not shown). Once the date has been selected from the calendar mode 860, the date information will show in the appropriate month 830, day 835 and year 840 locations. The secure session timer will begin automatically when the save 880 button is activated. The days 865, hours 870 and minutes 875 until the secure session timer expires will be displayed accordingly. If the administrator or digital content owner wishes to abandon all settings and return to the previous menu (not shown) they can do so by selecting cancel 885.

In addition to the secure session timer, the analyzer provides a token timer that enables the owner/administrator to set an expiration time and date for the token utilized to gain access to the protected digital content. While each token generated by the analyzer can only be used once, the timer enables the owner/administrator to put tighter constraints on the token, enhancing the overall security of the system.

Each secure session that occurs within the analyzer is initiated through the use of a PIN and token method. Specifically, when a user (either the digital content owner or the recipient of a share) wished to gain access to secured digital content, they will be required to enter their PIN (Personal Identification Number). The system (assuming the PIN information is validated) responds by returning a token to the person initiating the access to secured content.

The token is managed by a timer within the analyzer to control the length of time a token remains active. Once a token has expired, it cannot be reactivated and new token will be required. The analyzer tracks and records the token usage to maintain the integrity of the digital content being accessed and/or shared through the system. The token timer utilized to enable a local secured session will now be discussed with reference to FIG. 8B.

Figure 8B:
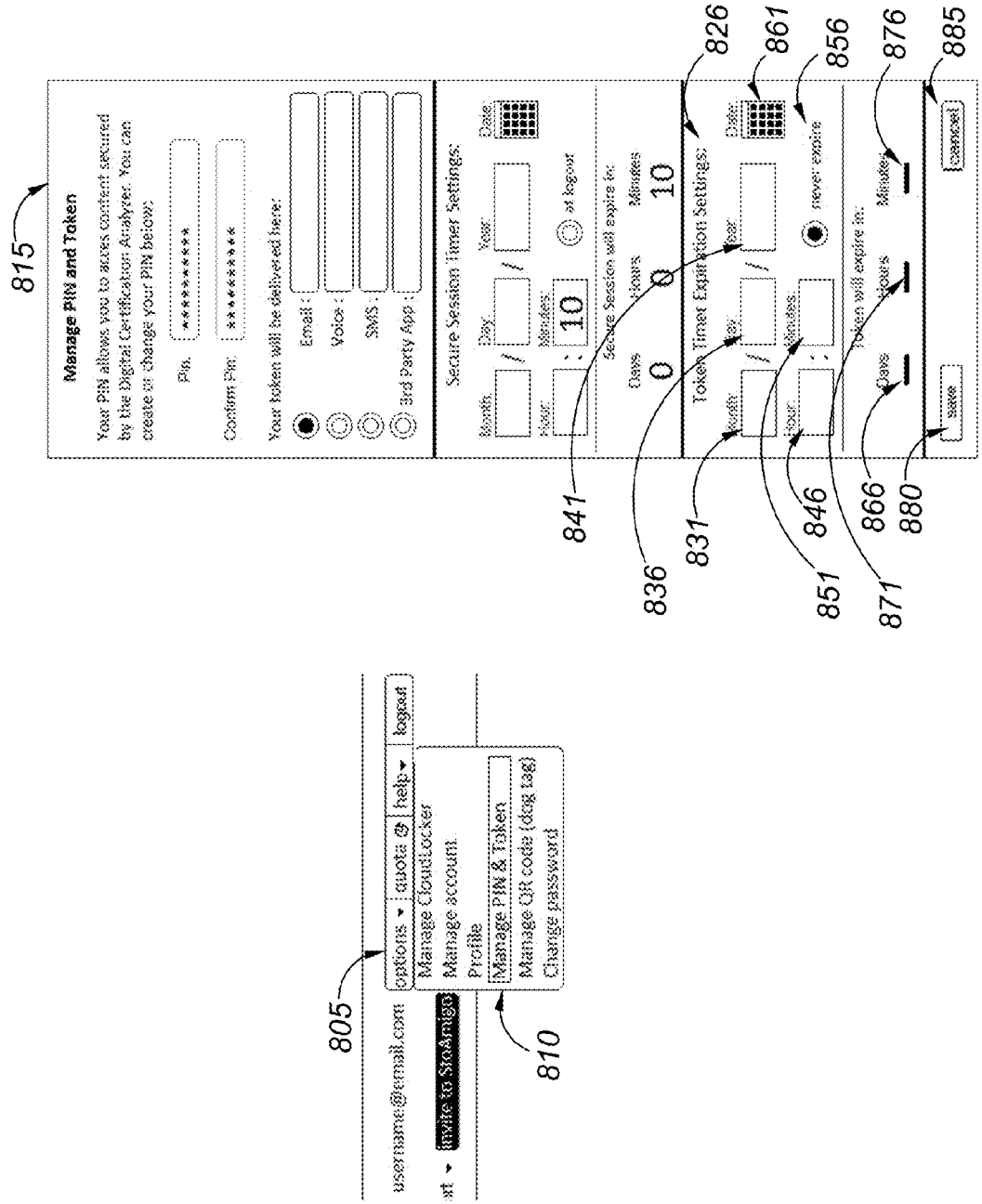
FIG. 8B is a diagram illustrating the details and functionality of the local (owner/administrator) token timer.

As can be seen in FIG. 8B, the token timer settings are managed through an interface screen (815) that provides a variety of functions to enable the owner/administrator to customize the analyzer to meet their specific needs. The owner/administrator can access the settings of token timer in the analyzer from the options 805 menu. By selecting Manage PIN & Token 810, the owner/administrator will open a window 815 that provides the detailed settings for the analyzer. As can be seen in FIG. 8B, the token timer settings 826 can be configured to provide the exact date and time for a token to expire. The owner/administrator can select the month 831, day 836 and year 841 of the expiration of the token, as well as the hour 846 and minutes 851. It is not necessary to populate a date unless the owner/administrator chooses to. The token timer will automatically populate the date fields if the hour 846 and minutes 851 exceed the end of the calendar day. The analyzer provides a clock that records the time and date automatically, and will update the token timer settings accordingly.

To ease the selection process of the expiration date of the token timer, a calendar mode 861 is available so the administrator or digital content owner can select the appropriate date from a calendar (not shown). Once the date has been selected from the calendar mode 861, the date information will show in the appropriate month 831, day 836 and year 841 locations. The token timer will begin automatically when the save 880 button is activated. The days 866, hours 871 and minutes 876 until the token timer expires will be displayed accordingly. If the administrator or digital content owner wishes to abandon all settings and return to the previous menu (not shown) they can do so by selecting cancel 885.

The owner/administrator can choose to disable the token timer by selecting the never expire 856 setting. This setting will disable the previously mentioned token timer settings, and set the token to never expire. Again, each token is valid for a single use only within the analyzer. So even if the owner/administrator chooses to disable the token timer (never expire 856), the token will still only work for a single use.

As stated previously, the token timer, share timer and secure session timer can also be applied to digital content that is shared from a system that is utilizing the analyzer. The system examples contained herein have utilized the StoAmigo file storage and sharing system as an example of how the analyzer can be implemented into a file sharing system to protect and secure digital content. The following examples will illustrate the controls and settings provided by the analyzer to protect digital content that is being shared. It's important to note that some file sharing systems (like StoAmigo) do not always allow a recipient of shared digital content to take ownership of it. Specifically, these systems (like StoAmigo) can be configured to allow recipients a "view only" access to digital content. The analyzer is well suited to protect shared digital content that is provided to a recipient in either a "view only" or a "downloadable" format.

The analyzer provides a share timer, a secure session timer and a token timer that govern access to a client/recipient of shared digital content. Specifically, the owner/administrator sharing the digital content can choose to set a timeframe for the share to remain in effect, choose a timeframe for the secure session period to last, and choose a time for the token utilized by the recipient to expire. These timers work to protect the digital content being shared, ensuring that the owner/administrator can maintain total control of their digital content.

In cases where a share timer and a secure session timer overlap, the timer that expires the earliest (first) will govern the expiration time of the shared digital content. The owner/administrator may (optionally) allow a recipient of shared digital content the option to extend their secure session timer to allow them additional time to access the content. In one example of this extension function, a teacher may be sharing a timed test with a group of students. The teacher may optionally allow a student that has historically struggled with the material to extend his or her session for a short period, while not granting that same extension to another student who has otherwise excelled in the class and would not have need for the extra time. This functionality is intended to allow flexibility in the secure session by allowing the client/recipient additional time to utilize the shared digital content. The share timer settings will now be discussed with reference to FIG. 9A.

Figure 9A:
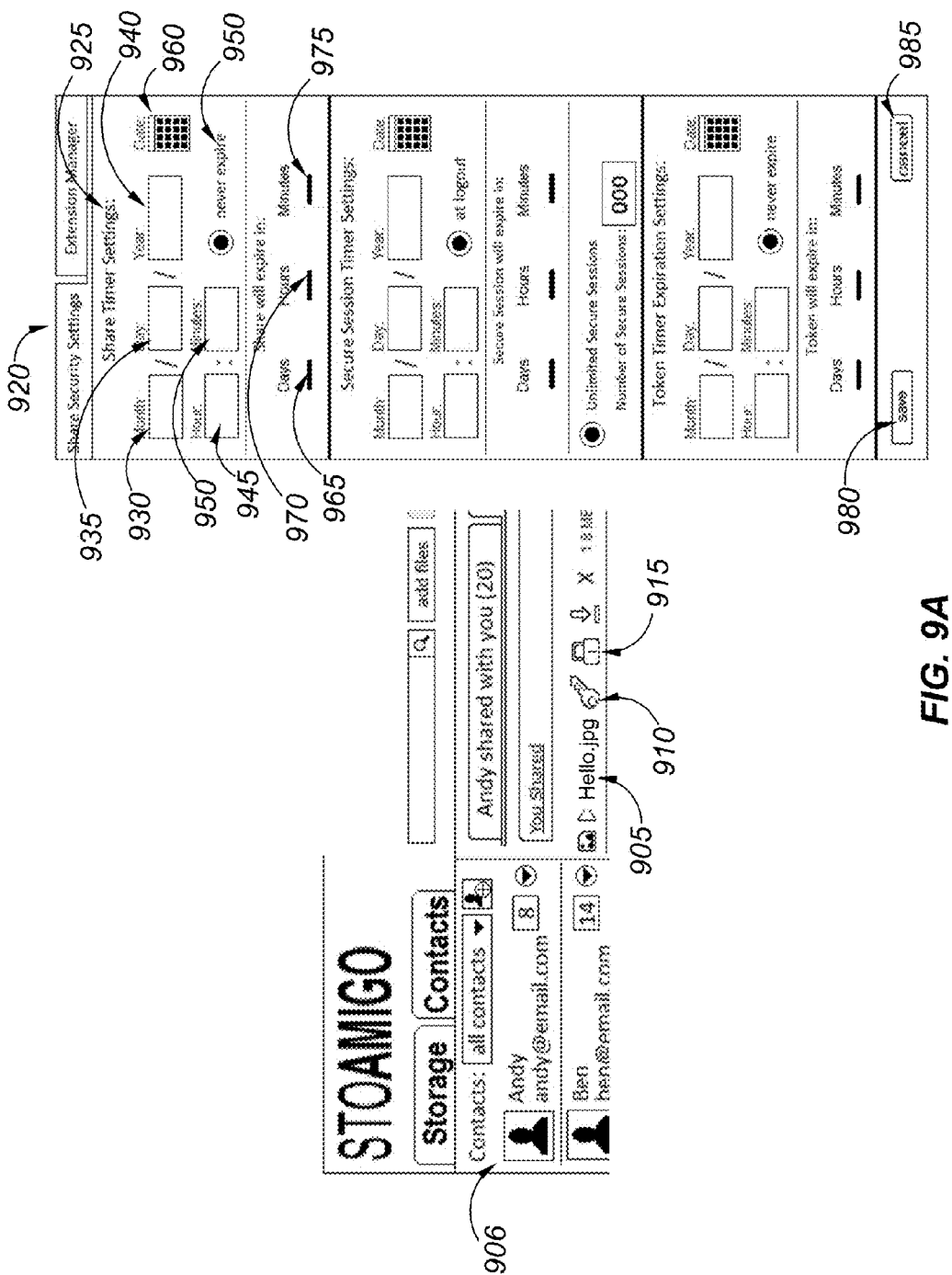
FIG. 9A is a diagram illustrating details and functionality of the share timer.

Referring to FIG. 9A, the owner/administrator has shared digital content 905 (hello.jpg) with a client/recipient 906 (Andy). To the right of the digital content 905 being shared is a key 910 icon and a lock 915 icon. The key 910 icon is utilized to enable/disable the analyzer, allowing the owner/administrator to protect the digital content being shared, or to otherwise leave the content unprotected. The lock 915 icon allows the owner/administrator to access the share security settings 920 menu, providing detailed options to govern access and availability of the shared digital content. The share timer settings 925 allow the owner/administrator to set the exact amount of time that the shared digital content will be made available. This timer will typically be utilized when shared digital content may be available for extended periods to one or more recipients, but wherein the sessions (governed by the session timer discussed below) will be set for shorter periods. By utilizing both the session timer and the share timer, the owner/administrator can control data traffic levels into and out of their respective service delivering the shared digital content to the client/recipient(s).

As can be seen in FIG. 9A, the share timer settings 925 can be configured to provide the exact date and time for a share to expire. The owner/administrator can select the month 930, day 935 and year 940 of the expiration of the share, as well as the hour 945 and minute 950. It is not necessary to populate a date unless the owner/administrator chooses to. The share timer will automatically populate the date fields if the hour 945 and minutes 950 exceed the end of the calendar day. The analyzer provides a clock that records the time and date automatically, and will update the share timer settings accordingly.

To ease the selection process of the expiration date of the share timer, a calendar mode 960 is available so the administrator or digital content owner can select the appropriate date from a calendar (not shown). Once the date has been selected from the calendar mode 960, the date information will show in the appropriate month 930, day 935 and year 940 locations. The share timer will begin automatically when the save 980 button is activated. The days 965, hours 970 and minutes 975 until the share timer expires will be displayed accordingly. If the administrator or digital content owner wishes to abandon all settings and return to the previous menu (not shown) they can do so by selecting cancel 985.

The owner/administrator can choose to disable the share timer by selecting the never expire 950 setting. This setting will disable the previously mentioned share timer settings, and set the share to never expire.

The share security settings menu 920 also provides settings that control the secure session timer utilized during the sharing of digital content. The secure session timer that governs access sessions of shared digital content will now be discussed with reference to FIG. 9B.

For the example in FIG. 9B, we will not repeat the discussion on how to access the share security settings menu 920 as it was previously discussed with reference to FIG. 9A.

Figure 9B:
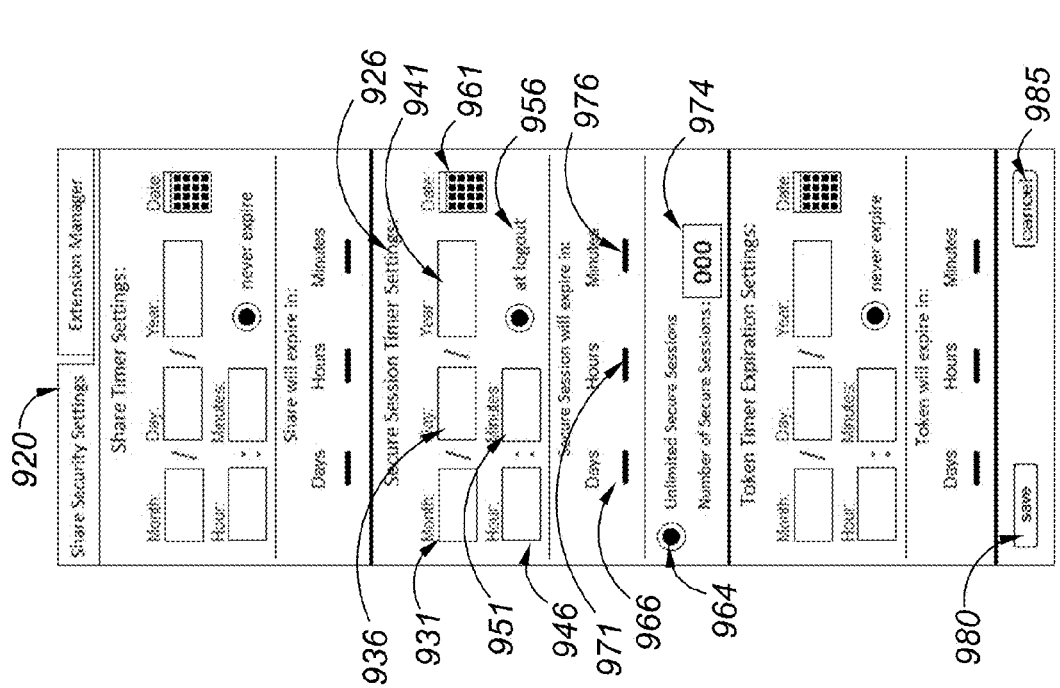
FIG. 9B is a diagram illustrating details and functionality of the secure session timer governing shared digital content.

Referring to FIG. 9B, the secure session timer settings 926 can be configured to provide the exact date and time for a secure session to expire. This provides the maximum amount of versatility when engaging the timer. The owner/administrator can select the month 931, day 936 and year 941 of the expiration of the secure session, as well as the hour 946 and minutes 951. It is not necessary to populate a date unless the owner/administrator chooses to. The secure session timer will automatically populate the date fields if the hour 946 and minutes 951 exceed the end of the calendar day. The analyzer provides a clock that records the time and date automatically, and will update the secure session timer settings accordingly. The secure session timer ensures that digital content accessed during the secure session is re-locked or otherwise re-secured upon completion of the session. By setting a timer, the owner/administrator can preset the termination of a secure session to ensure that the digital content will be re-locked or re-secured. The owner/administrator can choose to allow the secure session to continue until the client/recipient logs out 956, exiting the system. This setting will disable the previously mentioned secure session timer settings.

To ease the selection process of the expiration date of the secure session timer, a calendar mode 961 is available so the administrator or digital content owner can select the appropriate date from a calendar (not shown). Once the date has been selected from the calendar mode 961, the date information will show in the appropriate month 931, day 936 and year 941 locations. The secure session timer will begin automatically when the save 980 button is activated. The days 966, hours 971 and minutes 976 until the secure session timer expires will be displayed accordingly. If the administrator or digital content owner wishes to abandon all settings and return to the previous menu (not shown) they can do so by selecting cancel 985.

The analyzer provides the capability for the owner/administrator to limit the number of secure sessions available to the client/recipient of shared digital content. The number of sessions can be set by entering any number into the space provided 974. The number of sessions can be set from 1 to 999. The unlimited secure sessions 964 option will disable the number of secure sessions 974 entered, so the owner/administrator must ensure the unlimited secure sessions 964 is de-selected before entering a number into the space provided 974. FIG. 9B shows the unlimited secure sessions 964 is selected, so the number of secure sessions 974 will be grayed-out, and show zeros in the space provided.

In addition to the secure session timer to govern shared digital content, the analyzer provides a token timer for the client/recipient of shared digital content that enables the owner/administrator to set an expiration time and date for the token utilized to gain access to the protected digital content. While each token generated by the analyzer can only be used once, the timer enables the owner/administrator to put tighter constraints on the token, enhancing the overall security of the system.

The token utilized by the recipient of shared digital content is managed by a timer within the analyzer to control the length of time a token remains active. Once a token has expired, it cannot be reactivated and a new token will be required. The analyzer tracks and records the token usage to maintain the integrity of the digital content being accessed and/or shared through the system. The token timer utilized to govern access to shared digital content will now be discussed with reference to FIG. 9C.

The token timer for shared digital content can be accessed from the same share security settings 920 menu that the session and share timers are accessed from (as discussed in FIG. 9A and FIG. 9B).

Figure 9C:
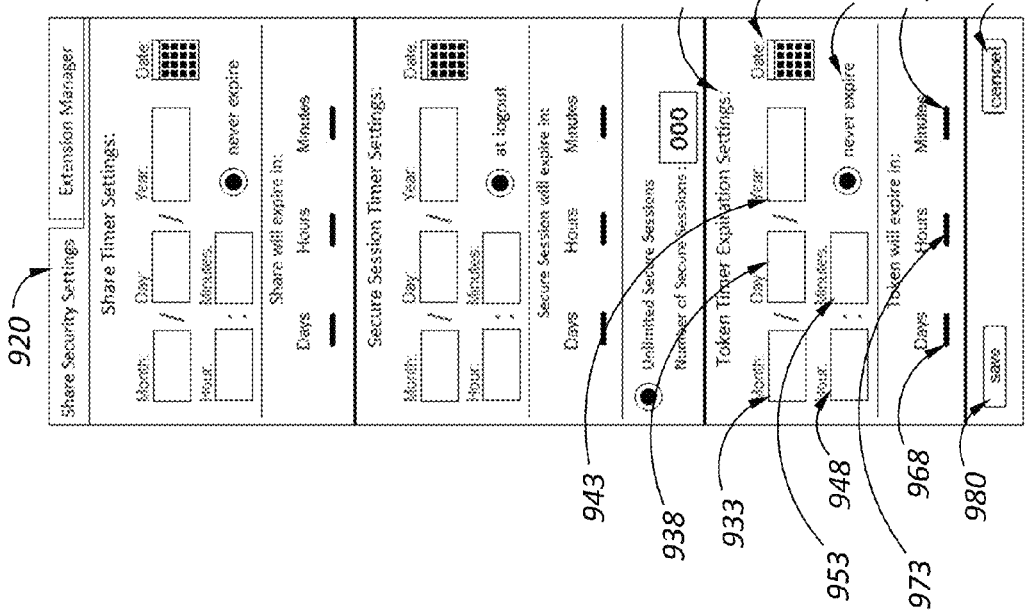
FIG. 9C is a diagram illustrating details and functionality of the token timer governing shared digital content.

As can be seen in FIG. 9C, the token timer settings 928 can be configured to provide the exact date and time for a token to expire. The owner/administrator can select the month 933, day 938 and year 943 of the expiration of the token, as well as the hour 948 and minutes 953. It is not necessary to populate a date unless the owner/administrator chooses to. The token timer will automatically populate the date fields if the hour 948 and minutes 953 exceed the end of the calendar day. The analyzer provides a clock that records the time and date automatically, and will update the token timer settings accordingly.

To ease the selection process of the expiration date of the token timer, a calendar mode 963 is available so the administrator or digital content owner can select the appropriate date from a calendar (not shown). Once the date has been selected from the calendar mode 963, the date information will show in the appropriate month 933, day 938 and year 943 locations. The token timer will begin automatically when the save 980 button is activated. The days 968, hours 973 and minutes 978 until the token timer expires will be displayed accordingly. If the administrator or digital content owner wishes to abandon all settings and return to the previous menu (not shown) they can do so by selecting cancel 985.

The owner/administrator can choose to disable the token timer by selecting the never expire 958 setting. This setting will disable the previously mentioned token timer settings, and set the token to never expire. Again, each token is valid for a single use only within the analyzer. So even if the owner/administrator chooses to disable the token timer (never expire 958), the token will still only work for a single use.

As stated previously, the analyzer provides the capability for the owner/administrator of the system to allow a client/recipient of shared digital content to extend their secure access session. The purpose of this is to allow some flexibility in the access to secure digital content for the client/recipient of a share. The digital content owner/administrator can determine the length of time an extension will last, as well as the number of extensions to be granted for that particular shared digital content. In instances where the secure session may be initiated for a student of a school (as an example) to take a test, it may be a benefit to the institution to allow that student to extend their time frame for completion by a specified period.

Figure 10:
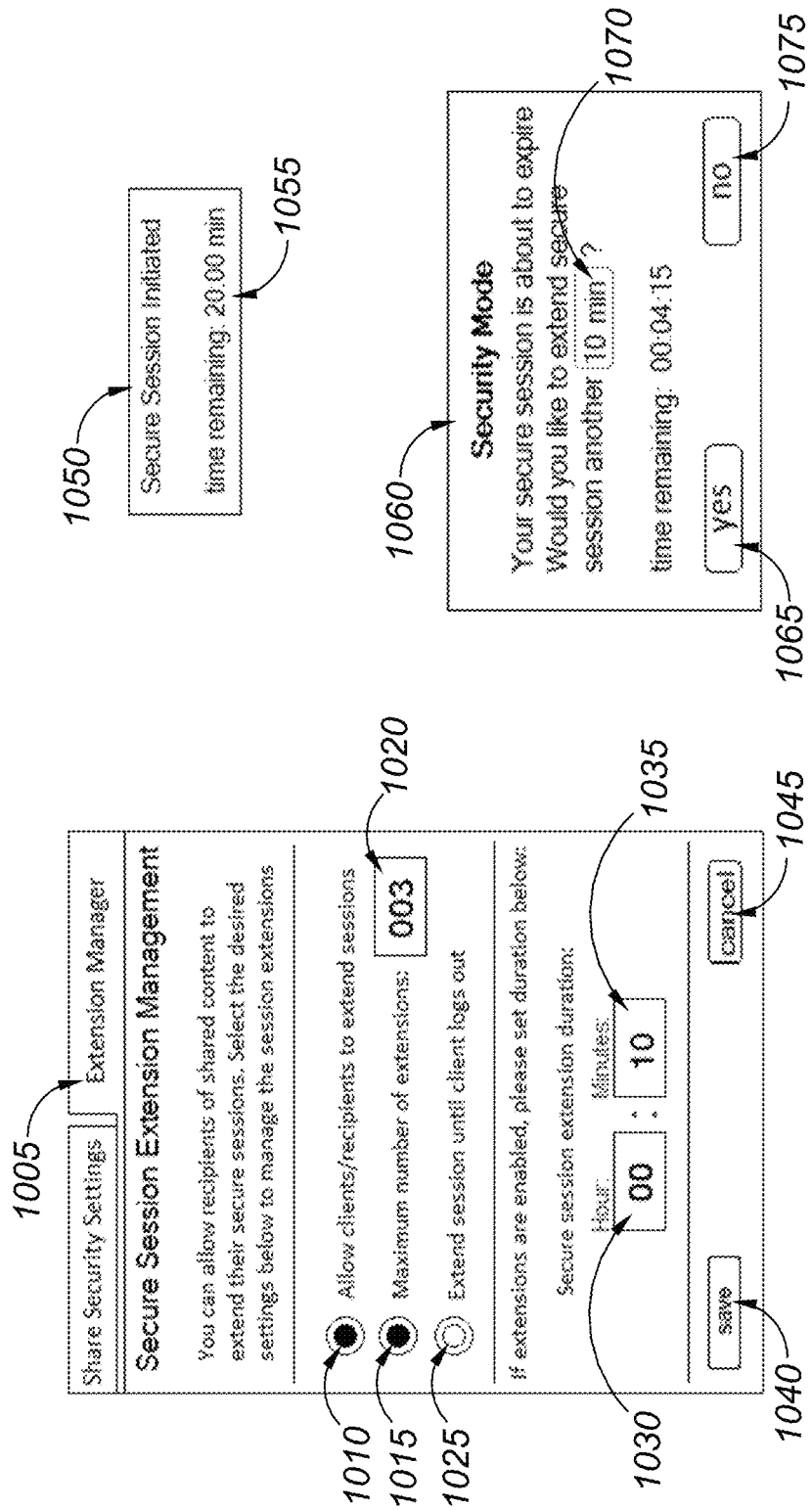
FIG. 10 is a diagram illustrating the details and functionality of the extension timer governing shared digital content.

The extension of a client/recipient secure session will now be discussed with reference to FIG. 10. As can be seen in FIG. 10, reference 1005 is the main menu screen for the secure session extension manager, which can be accessed by clicking the Extension Manager tab 1005. This menu provides options to manage the extensions granted to a client/recipient of shared digital content. In order to grant the client/recipient the option to extend their secure access sessions, the owner/administrator must grant that capability by selecting allow clients/recipients to extend sessions 1010. This option turns on the extension manager, and allows the subsequent options to be set. If this feature is not enabled (e.g. the radio button is not filled in) then the client/recipient of shared digital content will not be able to extend their secure sessions, and the access time granted will default to the settings chosen by the owner/administrator during the secure session timer settings discussion that took place previously with reference to FIG. 9B.

Once the client extension rights have been granted (enable 1010), the owner/administrator can choose to set a maximum number of extensions 1015 that will be granted to the client/recipient. By enabling the maximum number of extensions 1015, the owner/administrator can select an exact number of extensions that will be allowed for the secure session by putting that number in the space provided 1020. If the space 1020 is left blank and the maximum number of extensions 1015 is enabled, the analyzer will automatically default to one extension. Otherwise, the analyzer will comply with the number placed in the space provided 1020. If the owner/administrator chooses, they can allow the client/recipient to extend their secure sessions as many times as desired by selecting extend session until client logs out 1025. If this option is selected, the secure session will be extended until the client/recipient logs out of the secure session. This option will bypass the previously configured session timer settings discussed with reference to FIG. 9B.

The secure session extension manager 1005 is currently configured to (1) allow clients/recipients to extend sessions 1010, to (2) enable the maximum number of extensions 1015, to (3) have the maximum number of extensions 1020 set to 3. Since extensions 1010 are enabled, the owner/administrator can set the duration of the extension in the space provided, by selecting the hours 1030 and/or minutes 1035 for each extension. The secure session extension manager 1005 is currently configured for the default extension time of 10 minutes 1035 per extension. The owner/administrator can set the extension duration 1035 to any incremental number of minutes they choose. If no selection is made, the analyzer will default the extension duration 1035 to 10 minutes as shown in this example.

Once the selections for the secure session extension manager 1005 are completed, the owner/administrator can save 1040 them. The owner/administrator can choose to abandon their settings by selecting cancel 1045. If cancel 1045 is selected, the secure session extension manager 1005 will revert to the previously saved settings.

When a recipient enters a secure session, they will see a message appear on their screen 1050 notifying them that they have entered a secure session, and the duration of that secure session. As can be seen in FIG. 10 reference 1050, the secure session time is 20 minutes 1055. If the owner/administrator has granted the ability for the client/recipient to extend a secure session, (as described above with reference to FIG. 10, reference 1005) a security mode 1060 window will appear near the end of their secure session, notifying the client/recipient that their secure session is drawing to a close. The client/recipient can choose to extend their secure session by selecting yes 1065. The session extension time is controlled by the owner/administrator settings 1030 and 1035, and will be shown in the space provided 1070. If the client/recipient chooses not to extend their secure session they can select no 1075. Selecting no 1075 will cause the secure session to end at the original time preset by the owner/administrator. The time remaining in the secure session will be displayed in the security mode 1060 window.

The TESS system described herein is generally configured to enable digital content (files, folders) to be copied to a temporary external secured storage location in instances where the device hosting the digital content is going to be turned off, disconnected from the analyzer, or otherwise offline.

The TESS system is a software-based system, and can therefore exist in any environment where a file management system is desired and/or required. For example, the TESS system software may be stored on a non-transient storage medium or storage device and comprise instructions that provide the TESS system functionality as disclosed herein, when executed by a processor (or the like).

It is important to note that while, the TESS system being disclosed herein is being utilized as part of the analyzer within the STOAMIGO file sharing system in the following descriptions, the software-centric nature of the TESS system enables it to be utilized in virtually any environment wherein one or more computing devices are enlisted for the purpose of viewing, transferring, sharing, communicating, storing, or otherwise managing digital content.

Please note that the TESS system can be enabled and/or disabled at any time during a file transfer and/or share process, regardless of how long the transfer/share has been active. Disabling the TESS system while a transfer/share is active will deactivate the link connecting the transferred/shared digital content to the temporary external secured storage. This will prevent the temporary external secured storage from completing the transfer/share, and leave the transfer/share control to the primary host device. Only the host device may provide access if the TESS system is disabled.

Figure 11:
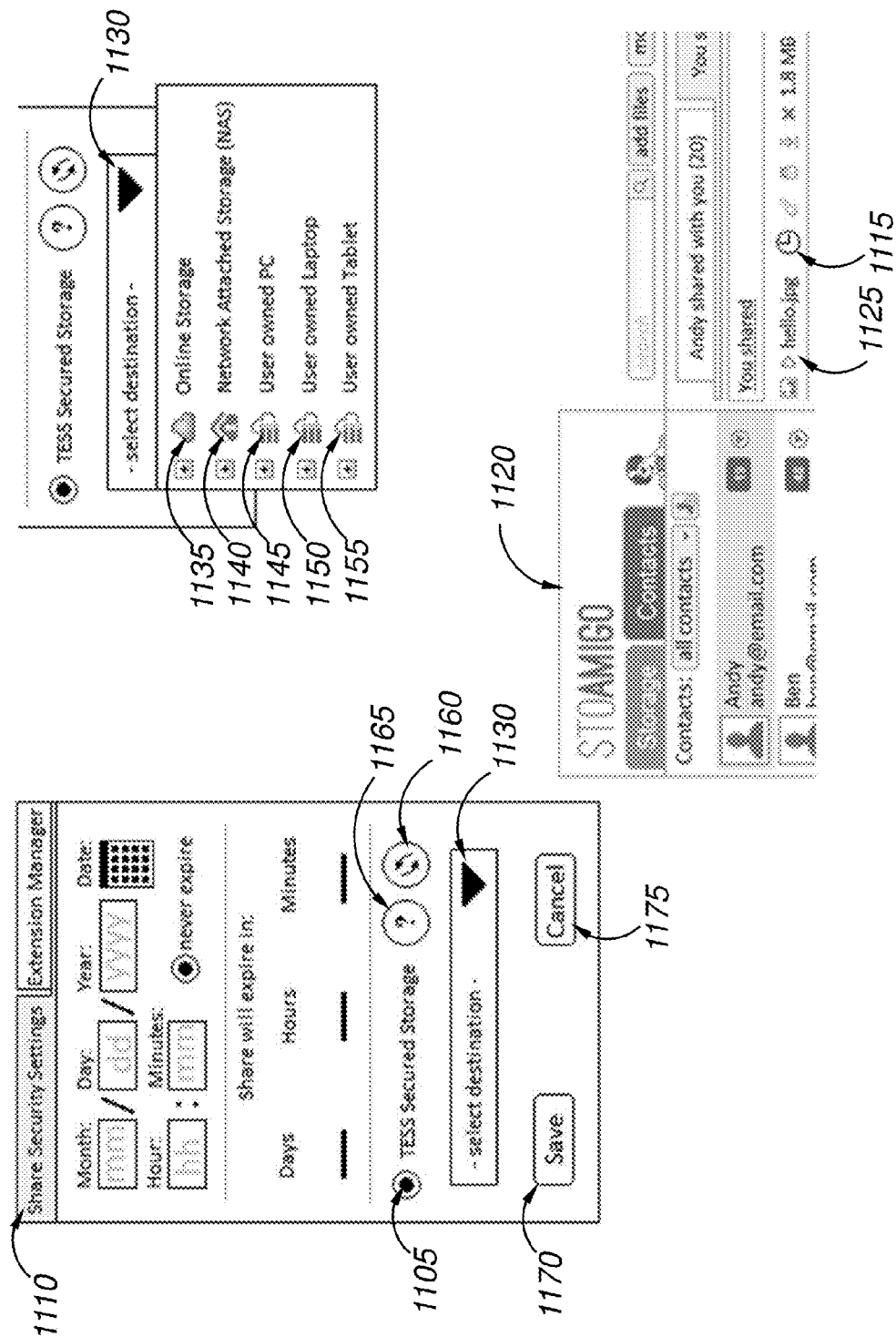
FIG. 11 is a diagram illustrating the functional components of the TESS system.

The TESS system will now be discussed with reference to FIG. 11. Referring to FIG. 11, the TESS system is enabled/disabled by actuating the radio button 1105 located on the share security settings 1110 menu screen. The radio button 1105 will appear dark (as shown) to serve as an indication that the TESS system is enabled. A clock icon 1115 that appears on the user interface screen 1120 will appear black (as shown) next to the file 1125 or digital content that is being transferred and/or shared through the TESS system. This serves as a simple indication to the user as to the status of the TESS system as it relates to the file 1125 or digital content being transferred and/or shared. Actuating the clock icon 1115 will automatically bring up the share security settings 1110 menu, allowing the user to access the TESS system settings.

Now that the TESS system is active (radio button 1105 is activated), the user can select a destination 1130 to externally store the file 1125 or digital content, enabling the recipient of the transfer and/or share to access and/or receive the file 1125 or digital content while the primary device hosting the file 1125 or digital content is turned off, or otherwise disconnected from the system. By actuating the select destination 1130 pull-down menu, the user can choose among the external storage locations that are available for their use. The destinations available can include (but are not limited to) online storage 1135; network attached storage 1140; the user owned PC 1145; the user owned laptop 1150, or the user owned tablet 1155. It is important to note that in the example configuration shown in FIG. 11, the TESS system is illustrating examples of external secured storage devices that can interact with the system, allowing a user to safely store their file 1125 or digital content externally of the host device. These storage repositories and devices are for example only, and may not be available on every deployment of the TESS system. Deployment will be governed by the system administrator/file owner, making storage options dependent upon deployment.

Once the user hosting the file 1125 or digital content to be shared selects a destination from the pull-down menu 1130, they can select save 1170 or cancel 1175. Selecting save 1170 will cause the file 1125 or digital content to be copied directly to the chosen destination (online storage 1135, network attached storage 1140, user owned pc 1145, user owned laptop 1150, or user owned tablet 1155). Selecting cancel 1175 will terminate any changes or selections made during the current configuration/provisioning session.

Once the file 1125 or digital content has been copied to the selected destination (as referenced above) it will remain active for transfer/share until the TESS system 1105 is disabled, or until the share timer settings (discussed with reference to FIG. 9B) expire, whichever occurs sooner. It is not necessary that the host device be turned off or otherwise disconnected from the analyzer for the TESS system to function. Once the TESS system has been enabled, the file 1125 or digital content will be transferred/shared from the destination (online storage 1135, network attached storage 1140, user owned pc 1145, user owned laptop 1150 or user owned tablet 1155) chosen by the user during provisioning of the TESS system.

In cases where the file 1125 or digital content being transferred/shared is updated or changed, the user can update the copy of the file 1125 or digital content to the temporary external secured storage location by selecting the refresh 1160 icon. Once selected, the TESS system will automatically send an updated copy of the file 1125 or digital content to the selected temporary external storage location (online storage 1135, network attached storage 1140, user owned pc 1145, user owned laptop 1150 or user owned tablet 1155) chosen by the user during provisioning of the TESS system. A help menu 1165 is available to assist the user in provisioning the TESS system.

Figure 12:
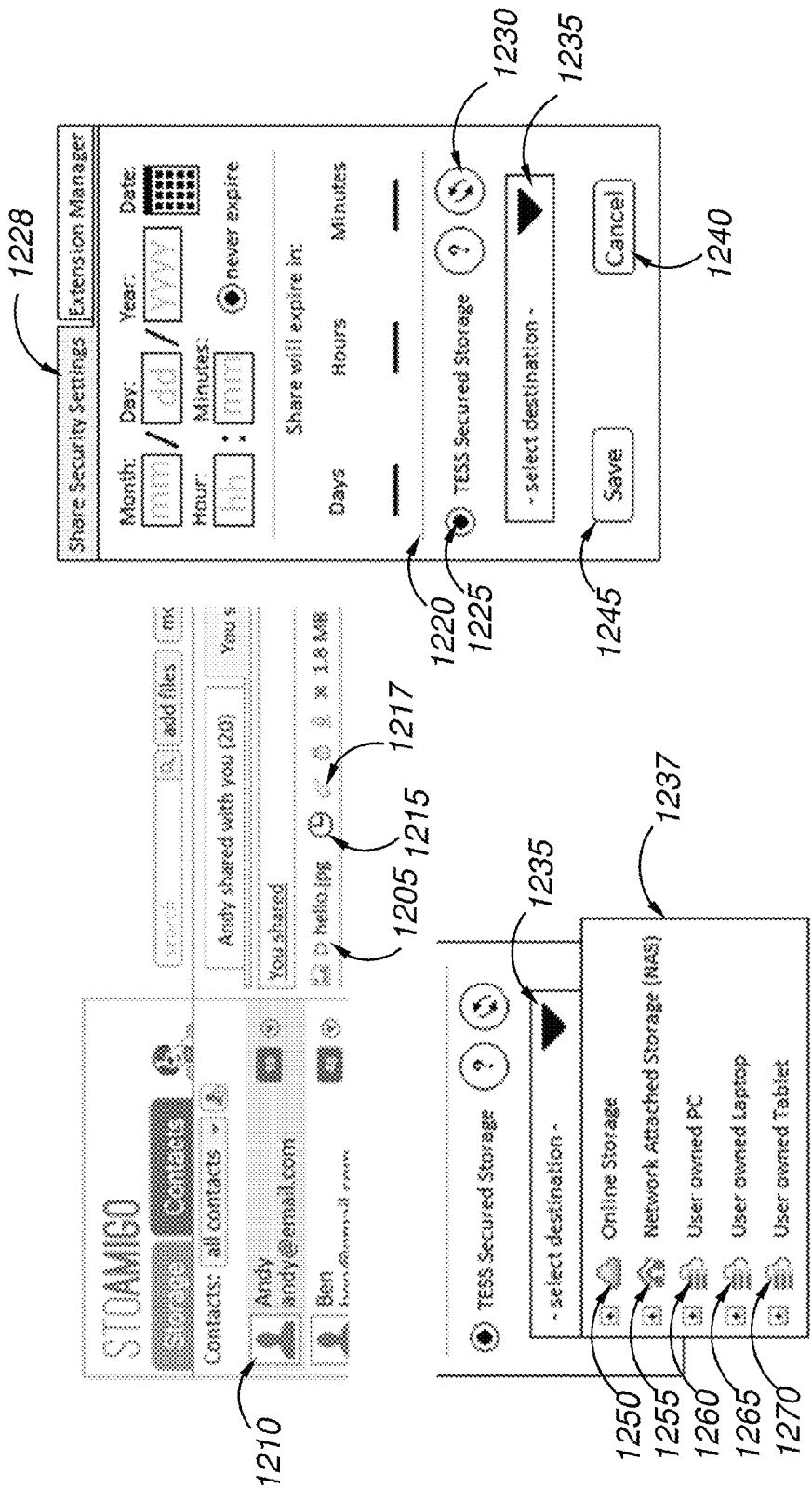
FIG. 12 is a diagram illustrating an example of the functional aspects of TESS system.

A discussion providing a functional example of the TESS system being used within the analyzer will now be discussed with reference to FIG. 12. Please note that while FIG. 12 shows a single example of engaging and utilizing the TESS system, a variety of other configurations and application aspects exist. For the purpose of simplification, FIG. 12 will be limited to utilizing the TESS system after a file or other digital content has been shared with a single recipient.

Referring to FIG. 12, a user has already shared an image file (hello.jpg) 1205 with a contact (Andy) 1210. The user now wishes to add the TESS system functionality to the shared image file hello.jpg 1205. The user selects the clock icon 1215, which opens up the share security settings 1228 menu, providing access to the TESS system 1220 menu settings below. To engage the TESS system, the user will actuate the radio button 1225, ensuring that the button appears black (as shown). Once that button is activated, the TESS system is engaged or otherwise turned on.

Now that the TESS system is activated, the user can select a destination location to host the temporary file by selecting the select destination 1235 menu. The select destination 1235 menu (once activated) will open up a pull-down menu 1237, providing a variety of different external secure storage locations for the user to choose from. The external secured storage locations may include (but are not limited to) online storage 1250; network attached storage 1255; a user owned personal computer 1260; a user owned laptop computer 1265, or a user owned tablet 1270. Any external drive or computing device connected to the analyzer and designated by the user may be utilized to house the file 1205 being shared. The user will only be allowed to select from a list of devices specific to him or her.

For the purpose of this example, we will assume the user has chosen to store the file 1205 (hello.jpg) on a user owned pc 1260. The user will highlight the user owned pc 1260 option, and then select a drive and/or folder (not pictured) within user owned pc 1260 in which to house the file 1205.

Once these selections are made, the user will select save 1245, causing the TESS system to send a copy of the file hello.jpg 1205 to the chosen destination (user owned pc 1260). This completes the TESS system sequence of operations.

The user can, at any time of their choosing, change the assignment of the temporary external secured storage by repeating the above process and selecting a different device from the select destination 1235 menu. Once the new destination has been selected, the user will again select save 1245, which will begin the copy process to the new selected storage location. The file (hello.jpg 1205) will be deleted from the prior location if/when a new location for storage is selected.

As previously stated, the TESS system may be disabled by deselecting the radio button 1225 from the share security settings 1228 menu. This action will cause the link to the externally stored file 1205 to no longer be valid, causing the system to make the file 1205 only available for access through the original host device (not pictured).

What is claimed is:

1. A digital certification analyzer comprising:
    one or more communication devices providing one or more communication links between the digital certification analyzer and one or more client devices;
    one or more storage devices that store digital content;
    one or more processors that:
        verify authentication information from the one or more client devices to establish a primary secure session;
        transmit a PIN request to the one or more client devices via the one or more communication links upon verification of the authentication information;
        verify a PIN number received from the one or more client devices in response to the PIN request and establish a secondary secure session; and
        transmit a token to the one or more client devices via the one or more communication links after the PIN number is verified;
    a session timer activated upon verification of the authentication information, wherein access to the digital content is terminated upon expiration of the session timer; and
    a token timer activated upon verification of the PIN number, wherein access to a subset of the digital content is terminated upon expiration of the token timer; and
    a share timer configured independently of the session timer and the token timer, wherein access to the digital content is terminated upon expiration of the share timer.

2. The digital certification analyzer of claim 1, wherein the one or more storage devices are part of a remote server or public cloud storage.

3. The digital certification analyzer of claim 1, wherein the one or more storage devices are selected from the group consisting of USB drives and hard drives.

4. The digital certification analyzer of claim 1 further comprising a database storing an expiration time for the session timer.

5. The digital certification analyzer of claim 4, wherein the database also stores an expiration time for the token timer.

6. The digital certification analyzer of claim 1, wherein the authentication information comprises a username and password.

7. The digital certification analyzer of claim 1, wherein the expiration of the token timer is extended upon receipt of input received via the one or more communication devices from an owner of the shared digital content before the token timer expires.

8. A machine-implemented method for digital certification comprising:
storing digital media received form from a first user on one or more storage devices;
establishing one or more communication links with a client device belonging to a second user via one or more communication devices;
receiving authentication information from the second user via the one or more communication devices and verifying the authentication information to establish a first secure session;
activating a session timer and permitting access to a first subset of the digital media after the authentication information is verified, wherein access to the first subset of digital media is terminated upon expiration of the session timer;
after verifying the authentication information, prompting the second user to input a PIN number at the client device and receiving the PIN number from the client device;
verifying the PIN number and establishing a second secure session after the PIN number is verified;
activating a token timer and permitting access to a second subset of the digital media upon verification of the PIN number, wherein access to the second subset of digital media is terminated upon expiration of the token timer; and
activating a share timer configured independently of the session timer and the token timer upon storing the digital media on the one or more storage devices, wherein access to all of the digital media is terminated upon expiration of the share timer.

9. The machine-implemented method of claim 8 wherein the one or more storage devices are selected by the first user from a plurality of distinct storage devices.

10. The machine-implemented method of claim 8, wherein the one or more storage devices are part of a remote server or public cloud storage.

11. The machine-implemented method of claim 8, wherein the one or more storage devices are selected from the group consisting of USB drives and hard drives.

12. The machine-implemented method of claim 8, wherein the expiration of the token timer is delayed upon receipt of input from the first user.

13. The machine-implemented method of claim 8 further comprising receiving an expiration time that defines the session timer's expiration from the first user.

14. The machine-implemented method of claim 8 further comprising transmitting a notification to the client device via the one or more communication devices to alert a second user of the existence of the digital media.

15. A machine-implemented method for digital certification comprising:
receiving and verifying authentication information to provide a primary secure session;
providing access to a first subset of digital media after the authentication information is verified;
activating a session timer after the authentication information is verified;
establishing a first communication link with a client device via one or more communication devices;
after verifying the authentication information, receiving a PIN via the first communication link and verifying the PIN;
generating a token after the PIN is verified, and establishing a secondary secure session;
activating a token timer and providing access to a second subset of the digital media after the PIN is verified; and
activating a share timer configured independently of the session timer and the token timer, wherein access to the first and second subsets of the digital media are terminated upon expiration of the share timer;
wherein access to the first subset of the digital media is terminated at the expiration of the session timer and access to the second subset of the digital media is terminated at the expiration of the token timer.

16. The machine-implemented method of claim 15 further comprising storing all of the digital media on one or more storage devices.

17. The machine-implemented method of claim 15 further comprising receiving a selection of at least one storage device from a plurality of storage devices, and storing all of the digital media on the at least one storage device.

18. The machine-implemented method of claim 15, wherein the digital media is stored on a remote server or public cloud storage.

19. The machine-implemented method of claim 15 further comprising delaying the expiration of the token timer is upon receipt of input from a user.

20. The machine-implemented method of claim 15, wherein the authentication information comprises a username and password.

* * * * *